(12) United States Patent
Bruin-Slot et al.

(10) Patent No.: US 10,837,651 B2
(45) Date of Patent: Nov. 17, 2020

(54) OVEN CAVITY CONNECTOR FOR OPERATING POWER ACCESSORY TRAYS FOR COOKING APPLIANCE

(71) Applicant: Whirlpool Corporation, Benton Harbor, MI (US)

(72) Inventors: Zachary J. Bruin-Slot, Baroda, MI (US); Christopher A. Gregory, St. Joseph, MI (US); Darrin H. McGee, Benton Harbor, MI (US); Rafael G. Reyes, St. Joseph, MI (US); Nathan C. Wier, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/863,990

(22) Filed: Sep. 24, 2015

(65) Prior Publication Data
US 2017/0089590 A1    Mar. 30, 2017

(51) Int. Cl.
*F24C 15/16* (2006.01)
*A47J 37/06* (2006.01)

(52) U.S. Cl.
CPC ........... *F24C 15/16* (2013.01); *A47J 37/0641* (2013.01); *F24C 15/164* (2013.01); *F24C 15/166* (2013.01)

(58) Field of Classification Search
CPC ...... F24C 15/16; F24C 15/164; F24C 15/166; A47J 37/0641

(Continued)

(56) References Cited

U.S. PATENT DOCUMENTS 1,141,176 A   6/1915  Copeman
1,380,656 A   6/1921  Lauth
(Continued)

FOREIGN PATENT DOCUMENTS

CA   2365023   7/2002
CA   2734926   10/2011
(Continued)

OTHER PUBLICATIONS

Built-In Gas Cooktop, image post date Feb. 18, 2015, originally in U.S. Appl. No. 29/539,768 in Restriction Requirement dated Oct. 27, 2016, 10 pages, <http://www.bestbuy.com/site/kitchenaid-36-built-in-gas-cooktop-stainless-steel/8636634.p?skuld=8636634>.
(Continued)

*Primary Examiner* — Chee-Chong Lee
(74) *Attorney, Agent, or Firm* — Price Heneveld LLP

(57) ABSTRACT

A cooking appliance includes sidewalls and a rear wall defining a heating cavity. At least one heat source is in thermal communication with the heating cavity. An oven cavity connector is disposed within an interior surface of the heating cavity. The oven cavity connector is in communication with the heating cavity. A first tray sliding structure is disposed proximate opposing vertical sidewalls of the heating cavity. A second tray sliding structure is disposed proximate the opposing vertical sidewalls and is vertically offset relative to the first tray sliding structure. A powered accessory tray has a connecting plug, the powered accessory tray being alternatively and selectively engaged with one of the first and second sliding tray structures, and the connecting plug is in selective communication with oven cavity connector when the powered accessory tray is engaged with any one of the first and second tray sliding structures.

8 Claims, 27 Drawing Sheets

(58) Field of Classification Search
USPC .......................................................... 219/413
See application file for complete search history.

(56) References Cited

U.S. PATENT DOCUMENTS

| | | |
|---|---|---|
| 1,405,624 A | 2/1922 | Patterson |
| 1,598,996 A | 9/1926 | Wheelock |
| 1,808,550 A | 6/1931 | Harpman |
| 2,024,510 A | 12/1935 | Crisenberry |
| 2,530,991 A | 11/1950 | Reeves |
| 2,536,613 A | 1/1951 | Schulze et al. |
| 2,699,912 A | 1/1955 | Cushman |
| 2,777,407 A | 1/1957 | Schindler |
| 2,781,038 A | 2/1957 | Sherman |
| 2,791,366 A | 5/1957 | Geisler |
| 2,815,018 A | 12/1957 | Collins |
| 2,828,608 A | 4/1958 | Cowlin et al. |
| 2,847,932 A | 8/1958 | More |
| 2,930,194 A | 5/1960 | Perkins |
| 2,934,957 A | 5/1960 | Reinhart et al. |
| D191,085 S | 8/1961 | Kindl et al. |
| 3,017,924 A | 1/1962 | Jenson |
| 3,051,813 A | 8/1962 | Busch et al. |
| 3,065,342 A | 11/1962 | Worden |
| 3,089,407 A | 5/1963 | Kinkle |
| 3,259,120 A | 7/1966 | Keating |
| 3,386,431 A | 6/1968 | Branson |
| 3,463,138 A | 8/1969 | Lotter et al. |
| 3,489,135 A | 1/1970 | Astrella |
| 3,548,154 A * | 12/1970 | Christiansson ........... F24C 7/06 219/403 |
| 3,602,131 A | 8/1971 | Dadson |
| 3,645,249 A | 2/1972 | Henderson et al. |
| 3,691,937 A | 9/1972 | Meek et al. |
| 3,731,035 A | 5/1973 | Jarvis et al. |
| 3,777,985 A | 12/1973 | Hughes et al. |
| 3,780,954 A | 12/1973 | Genbauffs |
| 3,857,254 A | 12/1974 | Lobel |
| 3,877,865 A | 4/1975 | Duperow |
| 3,899,655 A | 8/1975 | Skinner |
| D245,663 S | 9/1977 | Gordon |
| 4,104,952 A | 8/1978 | Brass |
| 4,149,518 A | 4/1979 | Schmidt et al. |
| 4,363,956 A | 12/1982 | Scheidler et al. |
| 4,413,610 A | 11/1983 | Berlik |
| 4,418,456 A | 12/1983 | Riehl |
| 4,447,711 A | 5/1984 | Fischer |
| 4,466,789 A | 8/1984 | Riehl |
| 4,518,346 A | 5/1985 | Pistien |
| 4,587,946 A | 5/1986 | Doyon et al. |
| 4,646,963 A | 3/1987 | Delotto et al. |
| 4,654,508 A | 3/1987 | Logel et al. |
| 4,689,961 A | 9/1987 | Stratton |
| 4,743,206 A * | 5/1988 | Imhoff ................. H01R 13/447 174/67 |
| 4,812,624 A | 3/1989 | Kern |
| 4,818,824 A | 4/1989 | Dixit et al. |
| 4,846,671 A | 7/1989 | Kwiatek |
| 4,886,043 A | 12/1989 | Homer |
| 4,891,936 A | 1/1990 | Shekleton et al. |
| D309,398 S | 7/1990 | Lund |
| 4,981,416 A | 1/1991 | Nevin et al. |
| 4,989,404 A | 2/1991 | Shekleton |
| 5,021,762 A | 6/1991 | Hetrick |
| 5,136,277 A | 8/1992 | Civanelli et al. |
| 5,171,951 A | 12/1992 | Chartrain et al. |
| D332,385 S | 1/1993 | Adams |
| 5,190,026 A | 3/1993 | Doty |
| 5,215,074 A | 6/1993 | Wilson et al. |
| 5,243,172 A | 9/1993 | Hazan et al. |
| D340,383 S | 10/1993 | Addison et al. |
| 5,272,317 A | 12/1993 | Ryu |
| D342,865 S | 1/1994 | Addison et al. |
| 5,316,423 A | 5/1994 | Kin |
| 5,397,234 A | 3/1995 | Kwiatek |
| 5,448,036 A | 9/1995 | Husslein et al. |
| D364,993 S | 12/1995 | Andrea |
| 5,491,423 A | 2/1996 | Turetta |
| D369,517 S | 5/1996 | Ferlin |
| 5,546,927 A | 8/1996 | Lancelot |
| 5,571,434 A | 11/1996 | Cavener et al. |
| D378,578 S | 3/1997 | Eberhardt |
| 5,618,458 A | 4/1997 | Thomas |
| 5,640,497 A | 6/1997 | Shute |
| 5,649,822 A | 7/1997 | Gertler et al. |
| 5,735,261 A | 4/1998 | Kieslinger |
| 5,785,047 A | 7/1998 | Bird et al. |
| 5,842,849 A | 12/1998 | Huang |
| 5,913,675 A | 6/1999 | Vago et al. |
| 5,928,540 A | 7/1999 | Antoine et al. |
| 5,938,959 A * | 8/1999 | Wang .................. A47J 37/0623 126/20 |
| D414,377 S | 9/1999 | Huang |
| 5,967,021 A | 10/1999 | Yung |
| 6,016,096 A | 1/2000 | Barnes et al. |
| 6,030,207 A | 2/2000 | Saleri |
| 6,049,267 A | 4/2000 | Barnes et al. |
| 6,050,176 A | 4/2000 | Schultheis et al. |
| 6,078,243 A | 6/2000 | Barnes et al. |
| 6,089,219 A | 7/2000 | Kodera et al. |
| 6,092,518 A | 7/2000 | Dane |
| 6,111,229 A | 8/2000 | Schultheis |
| 6,114,665 A | 9/2000 | Garcia et al. |
| 6,133,816 A | 10/2000 | Barnes et al. |
| 6,155,820 A | 12/2000 | Döbbeling |
| 6,188,045 B1 | 2/2001 | Hansen et al. |
| 6,192,669 B1 | 2/2001 | Keller et al. |
| 6,196,113 B1 | 3/2001 | Yung |
| 6,253,759 B1 | 7/2001 | Giebel et al. |
| 6,253,761 B1 | 7/2001 | Shuler et al. |
| 6,320,169 B1 | 11/2001 | Clothier |
| 6,322,354 B1 | 11/2001 | Carbone et al. |
| 6,362,458 B1 * | 3/2002 | Sargunam ............... F24C 15/14 219/396 |
| 6,452,136 B1 | 9/2002 | Berkcan et al. |
| 6,452,141 B1 | 9/2002 | Shon |
| 6,545,251 B2 * | 4/2003 | Allera ...................... F24C 7/06 126/339 |
| 6,589,046 B2 | 7/2003 | Harneit |
| 6,614,006 B2 | 9/2003 | Pastore et al. |
| 6,619,280 B1 | 9/2003 | Zhou et al. |
| 6,655,954 B2 | 12/2003 | Dane |
| 6,663,009 B1 | 12/2003 | Bedetti et al. |
| 6,718,965 B2 | 4/2004 | Rummel et al. |
| 6,733,146 B1 | 5/2004 | Vastano |
| 6,806,444 B2 | 10/2004 | Lemer |
| 6,837,151 B2 | 1/2005 | Chen |
| 6,891,133 B2 | 5/2005 | Shozo et al. |
| 6,910,342 B2 | 6/2005 | Berns et al. |
| 6,930,287 B2 | 8/2005 | Gerola et al. |
| 6,953,915 B2 | 10/2005 | Garris, III |
| 7,005,614 B2 | 2/2006 | Lee |
| 7,017,572 B2 | 3/2006 | Cadima |
| D524,105 S | 7/2006 | Poltronieri |
| 7,083,123 B2 | 8/2006 | Molla |
| 7,220,945 B1 | 5/2007 | Wang |
| D544,753 S | 6/2007 | Tseng |
| 7,274,008 B2 | 9/2007 | Arnal Valero et al. |
| 7,281,715 B2 | 10/2007 | Boswell |
| 7,291,009 B2 | 11/2007 | Kamal et al. |
| 7,315,247 B2 | 1/2008 | Jung et al. |
| 7,325,480 B2 | 2/2008 | Grühbaum et al. |
| D564,296 S | 3/2008 | Koch et al. |
| 7,348,520 B2 | 3/2008 | Wang |
| 7,411,160 B2 | 8/2008 | Duncan et al. |
| 7,414,203 B2 | 8/2008 | Winkler |
| 7,417,204 B2 | 8/2008 | Nam et al. |
| 7,429,021 B2 | 9/2008 | Sather et al. |
| 7,368,685 B2 | 11/2008 | Nam et al. |
| D581,736 S | 12/2008 | Besseas |
| 7,468,496 B2 | 12/2008 | Marchand |
| D592,445 S | 5/2009 | Sorenson et al. |
| 7,527,495 B2 | 5/2009 | Yam et al. |
| D598,959 S | 8/2009 | Kiddoo |

(56) References Cited

U.S. PATENT DOCUMENTS

| | | |
|---|---|---|
| 7,589,299 B2 | 9/2009 | Fisher et al. |
| D604,098 S | 11/2009 | Hamlin |
| 7,614,877 B2 | 11/2009 | McCrorey et al. |
| 7,628,609 B2 | 12/2009 | Pryor et al. |
| 7,640,930 B2 | 1/2010 | Little et al. |
| 7,696,454 B2 | 4/2010 | Nam et al. |
| 7,708,008 B2 | 5/2010 | Elkasevic et al. |
| 7,721,727 B2 | 5/2010 | Kobayashi |
| 7,731,493 B2 | 6/2010 | Starnini et al. |
| 7,762,250 B2 | 7/2010 | Elkasevic et al. |
| 7,770,985 B2 | 8/2010 | Davis et al. |
| 7,781,702 B2 | 8/2010 | Nam et al. |
| 7,823,502 B2 | 11/2010 | Hecker et al. |
| 7,829,825 B2 | 11/2010 | Kuhne |
| 7,840,740 B2 | 11/2010 | Minoo |
| 7,841,333 B2 | 11/2010 | Kobayashi |
| 7,964,823 B2 | 6/2011 | Armstrong et al. |
| D642,675 S | 8/2011 | Scribano et al. |
| 8,006,687 B2 | 8/2011 | Watkins et al. |
| 8,015,821 B2 | 9/2011 | Spytek |
| 8,037,689 B2 | 10/2011 | Oskin et al. |
| 8,057,223 B2 | 11/2011 | Pryor et al. |
| 8,141,549 B2 | 3/2012 | Armstrong et al. |
| 8,217,314 B2 | 7/2012 | Kim et al. |
| 8,220,450 B2 | 7/2012 | Luo et al. |
| 8,222,578 B2 | 7/2012 | Beier |
| D665,491 S | 8/2012 | Goel et al. |
| 8,272,321 B1 | 9/2012 | Kalsi et al. |
| 8,288,690 B2 | 10/2012 | Boubeddi et al. |
| 8,302,593 B2 | 11/2012 | Cadima |
| 8,304,695 B2 | 11/2012 | Bonuso et al. |
| 8,342,165 B2 | 1/2013 | Watkins |
| 8,344,292 B2 | 1/2013 | Franca et al. |
| 8,356,367 B2 | 1/2013 | Flynn |
| 8,393,317 B2 | 3/2013 | Sorenson et al. |
| 8,398,303 B2 | 3/2013 | Kuhn |
| 8,430,310 B1 | 4/2013 | Ho et al. |
| 8,464,703 B2 | 6/2013 | Ryu et al. |
| D685,225 S | 7/2013 | Santoyo et al. |
| D687,675 S | 8/2013 | Filho et al. |
| 8,522,675 B2* | 9/2013 | Veltrop .................. A23L 3/005 219/214 |
| 8,526,935 B2 | 9/2013 | Besore et al. |
| 8,535,052 B2 | 9/2013 | Cadima |
| D693,175 S | 11/2013 | Saubert |
| 8,584,663 B2 | 11/2013 | Kim et al. |
| 8,596,259 B2 | 12/2013 | Padgett et al. |
| 8,616,193 B2 | 12/2013 | Padgett |
| 8,660,297 B2 | 2/2014 | Yoon et al. |
| 8,687,842 B2 | 4/2014 | Yoon et al. |
| 8,689,782 B2 | 4/2014 | Padgett |
| 8,707,945 B2 | 4/2014 | Hasslberger et al. |
| 8,747,108 B2 | 6/2014 | Lona Santoyo et al. |
| 8,800,543 B2 | 8/2014 | Simms et al. |
| D718,061 S | 11/2014 | Wu |
| 8,887,710 B2 | 11/2014 | Rossi et al. |
| 8,930,160 B2 | 1/2015 | Wall et al. |
| 8,932,049 B2 | 1/2015 | Ryu et al. |
| 8,950,389 B2 | 2/2015 | Horstkoetter et al. |
| 8,978,637 B2 | 3/2015 | Ryu et al. |
| D727,489 S | 4/2015 | Rohskopf et al. |
| 9,021,942 B2 | 5/2015 | Lee et al. |
| 9,074,765 B2 | 7/2015 | Armanni |
| D735,525 S | 8/2015 | Nguyen |
| 9,113,503 B2 | 8/2015 | Arnal Valero et al. |
| 9,132,302 B2 | 9/2015 | Luongo et al. |
| D743,203 S | 11/2015 | Filho et al. |
| 9,175,858 B2 | 11/2015 | Tisselli et al. |
| D750,314 S | 2/2016 | Hobson et al. |
| 9,307,888 B2 | 4/2016 | Baldwin et al. |
| D758,107 S | 6/2016 | Hamilton |
| 9,400,115 B2 | 7/2016 | Kuwamura |
| D766,036 S | 9/2016 | Koch et al. |
| D766,696 S | 9/2016 | Kemker |
| 9,513,015 B2 | 12/2016 | Estrella et al. |
| 9,521,708 B2 | 12/2016 | Adelmann et al. |
| 9,557,063 B2 | 1/2017 | Cadima |
| 9,572,475 B2 | 2/2017 | Gephart et al. |
| 9,644,847 B2 | 5/2017 | Bhogal et al. |
| 9,696,042 B2 | 7/2017 | Hasslberger et al. |
| 9,879,864 B2 | 1/2018 | Gutierrez et al. |
| 9,927,129 B2 | 3/2018 | Bhogal et al. |
| 2002/0065039 A1 | 5/2002 | Benezech et al. |
| 2004/0007566 A1 | 1/2004 | Staebler et al. |
| 2004/0031782 A1 | 2/2004 | Westfield |
| 2004/0182849 A1* | 9/2004 | Shozo ..................... F24C 7/06 219/403 |
| 2004/0195399 A1 | 10/2004 | Molla |
| 2004/0224273 A1 | 11/2004 | Inomata |
| 2004/0224274 A1 | 11/2004 | Tomiura |
| 2005/0029245 A1 | 2/2005 | Gerola et al. |
| 2005/0112520 A1 | 5/2005 | Todoli et al. |
| 2005/0199232 A1 | 9/2005 | Gama et al. |
| 2005/0268000 A1 | 12/2005 | Carlson |
| 2005/0268794 A1 | 12/2005 | Nesterov |
| 2007/0049079 A1* | 3/2007 | Nalwad ............. H01R 13/4532 439/137 |
| 2007/0124972 A1 | 6/2007 | Ratcliffe |
| 2007/0181410 A1 | 8/2007 | Baier |
| 2007/0251936 A1* | 11/2007 | Nam ..................... F24C 15/166 219/413 |
| 2007/0281267 A1 | 12/2007 | Li |
| 2008/0029081 A1 | 2/2008 | Gagas |
| 2008/0050687 A1 | 2/2008 | Wu |
| 2008/0173632 A1 | 7/2008 | Jang et al. |
| 2008/0210685 A1 | 9/2008 | Beier |
| 2009/0173730 A1 | 7/2009 | Baier et al. |
| 2009/0320823 A1 | 12/2009 | Padgett |
| 2010/0035197 A1 | 2/2010 | Cadima |
| 2010/0114339 A1 | 5/2010 | Kaiser et al. |
| 2010/0126496 A1 | 5/2010 | Luo et al. |
| 2010/0154776 A1 | 6/2010 | Czajka et al. |
| 2010/0192939 A1 | 8/2010 | Parks |
| 2011/0027733 A1 | 2/2011 | Yamamoto et al. |
| 2011/0142998 A1 | 6/2011 | Johncock et al. |
| 2011/0163086 A1 | 7/2011 | Aldana Arjol et al. |
| 2011/0248021 A1 | 10/2011 | Gutierrez et al. |
| 2012/0017595 A1 | 1/2012 | Liu |
| 2012/0024835 A1 | 2/2012 | Artal Lahoz et al. |
| 2012/0036855 A1 | 2/2012 | Hull |
| 2012/0067334 A1 | 3/2012 | Kim et al. |
| 2012/0076351 A1 | 3/2012 | Yoon et al. |
| 2012/0099761 A1 | 4/2012 | Yoon et al. |
| 2012/0160228 A1 | 6/2012 | Kim et al. |
| 2012/0171343 A1 | 7/2012 | Cadima et al. |
| 2012/0261405 A1 | 10/2012 | Kurose et al. |
| 2013/0043239 A1 | 2/2013 | Anton Falcon et al. |
| 2013/0109207 A1* | 5/2013 | Bhosale ............. H01R 13/4534 439/137 |
| 2013/0252188 A1 | 9/2013 | Chen |
| 2013/0255663 A1 | 10/2013 | Cadima et al. |
| 2013/0260618 A1 | 10/2013 | Bally et al. |
| 2014/0048055 A1 | 2/2014 | Ruther |
| 2014/0071019 A1 | 3/2014 | Lim |
| 2014/0090636 A1 | 4/2014 | Bettinzoli |
| 2014/0097172 A1 | 4/2014 | Kang et al. |
| 2014/0116416 A1 | 5/2014 | Saubert |
| 2014/0137751 A1 | 5/2014 | Bellm |
| 2014/0139381 A1 | 5/2014 | Sippel |
| 2014/0318527 A1 | 10/2014 | Silva et al. |
| 2014/0352549 A1 | 12/2014 | Upston et al. |
| 2015/0096974 A1 | 4/2015 | Freeman et al. |
| 2015/0136760 A1 | 5/2015 | Lima et al. |
| 2015/0153041 A1 | 6/2015 | Neumeier |
| 2015/0241069 A1 | 8/2015 | Brant et al. |
| 2015/0330640 A1 | 11/2015 | Wersborg |
| 2015/0345800 A1 | 12/2015 | Cabrera Botello |
| 2015/0359045 A1 | 12/2015 | Neukamm et al. |
| 2016/0029439 A1 | 1/2016 | Kurose et al. |
| 2016/0061490 A1 | 3/2016 | Cho et al. |
| 2016/0091210 A1 | 3/2016 | Ceccoli |
| 2016/0095469 A1 | 4/2016 | Gregory et al. |
| 2016/0116160 A1 | 4/2016 | Takeuchi |
| 2016/0153666 A1 | 6/2016 | Tcaciuc |

(56) References Cited

U.S. PATENT DOCUMENTS

| | | |
|---|---|---|
| 2016/0174768 A1 | 6/2016 | Deverse |
| 2016/0178209 A1 | 6/2016 | Park et al. |
| 2016/0178212 A1 | 6/2016 | Park et al. |
| 2016/0187002 A1 | 6/2016 | Ryu et al. |
| 2016/0201902 A1 | 7/2016 | Cadima |
| 2016/0209044 A1 | 7/2016 | Cadima |
| 2016/0209045 A1 | 7/2016 | Millius |
| 2016/0295644 A1 | 10/2016 | Khokle et al. |
| 2016/0296067 A1 | 10/2016 | Laws |
| 2017/0003033 A1 | 1/2017 | Lona Santoyo et al. |
| 2017/0067651 A1 | 3/2017 | Khokle et al. |
| 2017/0074522 A1 | 3/2017 | Cheng |
| 2017/0082296 A1 | 3/2017 | Jeong et al. |
| 2017/0082299 A1 | 3/2017 | Rowley et al. |
| 2017/0108228 A1 | 4/2017 | Park et al. |
| 2017/0115008 A1 | 4/2017 | Erbe et al. |
| 2017/0261213 A1 | 4/2017 | Park et al. |
| 2017/0223774 A1 | 8/2017 | Cheng et al. |
| 2018/0058702 A1 | 3/2018 | Jang et al. |

FOREIGN PATENT DOCUMENTS

| | | |
|---|---|---|
| CN | 201680430 U | 12/2010 |
| DE | 7242625 | 3/1973 |
| DE | 2845869 A1 | 4/1980 |
| DE | 3014908 A1 | 10/1981 |
| DE | 3238441 A1 | 4/1984 |
| DE | 3446621 A1 | 6/1986 |
| DE | 3717728 A1 | 12/1988 |
| DE | 3150450 C2 | 8/1989 |
| DE | 3839657 A1 | 5/1990 |
| DE | 4103664 C1 | 1/1992 |
| DE | 4228076 | 5/1993 |
| DE | 4445594 A1 | 6/1996 |
| DE | 10218294 A1 | 11/2003 |
| DE | 60004581 | 6/2004 |
| DE | 102004002466 A1 | 8/2005 |
| DE | 1020040009606 | 9/2005 |
| DE | 102005059505 A1 | 6/2007 |
| DE | 19912452 B4 | 10/2007 |
| DE | 102006034391 A1 | 1/2008 |
| DE | 102007021297 A1 | 11/2008 |
| DE | 102008027220 A1 | 12/2009 |
| DE | 102008042467 A1 | 4/2010 |
| DE | 102008051829 A1 | 4/2010 |
| DE | 102009002276 A1 | 10/2010 |
| DE | 102013218714 A1 | 4/2014 |
| EP | 0000908 A1 | 3/1979 |
| EP | 0122966 A2 | 10/1984 |
| EP | 0429120 A2 | 5/1991 |
| EP | 0620698 A1 | 10/1994 |
| EP | 0690659 A2 | 1/1996 |
| EP | 1030114 | 8/2000 |
| EP | 1217306 A2 | 6/2002 |
| EP | 1344986 A1 | 9/2003 |
| EP | 1586822 A1 | 10/2005 |
| EP | 1617148 A1 | 1/2006 |
| EP | 1099905 B1 | 2/2006 |
| EP | 1201998 B1 | 3/2006 |
| EP | 1460342 B1 | 5/2006 |
| EP | 2063181 A2 | 5/2009 |
| EP | 2063444 A1 | 5/2009 |
| EP | 2070442 | 6/2009 |
| EP | 2116775 A1 | 11/2009 |
| EP | 2116829 A1 | 11/2009 |
| EP | 2278227 A2 | 1/2011 |
| EP | 2299181 | 3/2011 |
| EP | 2375170 | 10/2011 |
| EP | 2144012 B1 | 9/2012 |
| EP | 2657615 A1 | 10/2013 |
| EP | 2816291 A1 | 12/2014 |
| EP | 2835580 A2 | 2/2015 |
| EP | 3006832 | 4/2016 |
| EP | 2848867 B1 | 9/2017 |
| FR | 2712071 | 5/1995 |
| FR | 2787556 A1 | 6/2000 |
| FR | 2789753 | 8/2000 |
| FR | 3003338 A1 | 9/2014 |
| GB | 2158225 A | 11/1985 |
| JP | 2001141244 A | 5/2001 |
| JP | 2005009693 A | 1/2005 |
| JP | 2007147131 A | 6/2007 |
| JP | 2010038475 A | 2/2010 |
| JP | 2011144982 A | 7/2011 |
| JP | 2011257021 A | 12/2011 |
| WO | 1991013526 A1 | 9/1991 |
| WO | 9850736 A1 | 11/1998 |
| WO | 2006072388 A1 | 7/2006 |
| WO | 2006136363 A1 | 12/2006 |
| WO | 2012077050 A2 | 6/2012 |
| WO | 2013098330 A2 | 7/2013 |
| WO | 2013104521 A1 | 7/2013 |
| WO | 2013182410 A1 | 12/2013 |
| WO | 2014194176 A1 | 12/2014 |
| WO | 2015086420 A1 | 6/2015 |

OTHER PUBLICATIONS

True-Heat burner, image post date Jan. 30, 2015, originally in U.S. Appl. No. 29/539,768 in Restriction Requirement dated Oct. 27, 2016, 2 pages, <http://ovens.reviewed.com/news/kitchenaid-has-a-new-flame>.

Metal Cover Gas Hob, image post date 2012, originally in U.S. Appl. No. 29/539,768 in Restriction Requirement dated Oct. 27, 2016, 13 pages, <http://inse.gmc.globalmarket.com/products/details/metal-cover-gas-hob-8516959.html>.

Penny Stove, image post date 2004, originally in U.S. Appl. No. 29/539,768 in Restriction Requirement dated Oct. 27, 2016, 30 pages, <http://www.jureystudio.com/pennystove/stoveinstruction.html>.

* cited by examiner

OVEN CAVITY CONNECTOR FOR OPERATING POWER ACCESSORY TRAYS FOR COOKING APPLIANCE

BACKGROUND

The device is in the field of cooking appliances, specifically, a system for powering a series of accessory trays through a cavity connector disposed within the cooking cavity of the appliance.

SUMMARY

In at least one aspect, a cooking appliance includes a plurality of sidewalls and a rear wall defining a heating cavity. At least one heat source is in thermal communication with the heating cavity. An oven cavity connector is disposed within an interior surface of the heating cavity. The oven cavity connector is in communication with the heating cavity. A first tray sliding structure is disposed proximate opposing vertical sidewalls of the plurality of sidewalls. A second tray sliding structure is disposed proximate the opposing vertical sidewalls. The second tray sliding structure is vertically offset relative to the first tray sliding structure. A powered accessory tray has a connecting plug, the powered accessory tray being alternatively and selectively engaged with one of the first and second sliding tray structures, and the connecting plug is in selective communication with the oven cavity connector when the powered accessory tray is engaged with any one of the first and second tray sliding structures.

In at least another aspect, a cooking appliance includes a plurality of sidewalls and an operable door. The plurality of sidewalls defines an interior surface of a heating cavity. At least one heat source is disposed in thermal communication with the heating cavity. An oven cavity connector is positioned within at least one of the plurality of sidewalls, and the oven cavity connector includes a plurality of electrical contacts disposed within a connector interior, the connector interior being in communication with the heating cavity. At least one operable door selectively encloses the connector interior when the at least one operable door is in an idle state. The at least one operable door is biased toward the idle state, and the at least one operable door is adapted to be biased into the connector interior and toward an engaged state when a connecting plug of a powered accessory tray is engaged with the oven cavity connector.

In at least another aspect, a powered accessory tray system for use in a cooking appliance includes a plurality of powered accessory trays, each powered accessory tray comprising a base tray that alternatively and selectively engages a tray sliding structure of a plurality of tray sliding structures defined within a heating cavity of the cooking appliance, the base tray being slidably engaged with the tray sliding structure. A powered portion is supported by the base tray, wherein the powered portion receives electrical power from the cooking appliance. A connecting plug is in communication with the cooking appliance and the powered portion of the powered accessory tray, wherein selective engagement of the connecting plug with an oven cavity connector disposed within the heating cavity of the cooking appliance places the powered portion in communication with the cooking appliance.

These and other features, advantages, and objects of the present device will be further understood and appreciated by those skilled in the art upon studying the following specification, claims, and appended drawings.

DETAILED DESCRIPTION OF EMBODIMENTS

Figure 1:
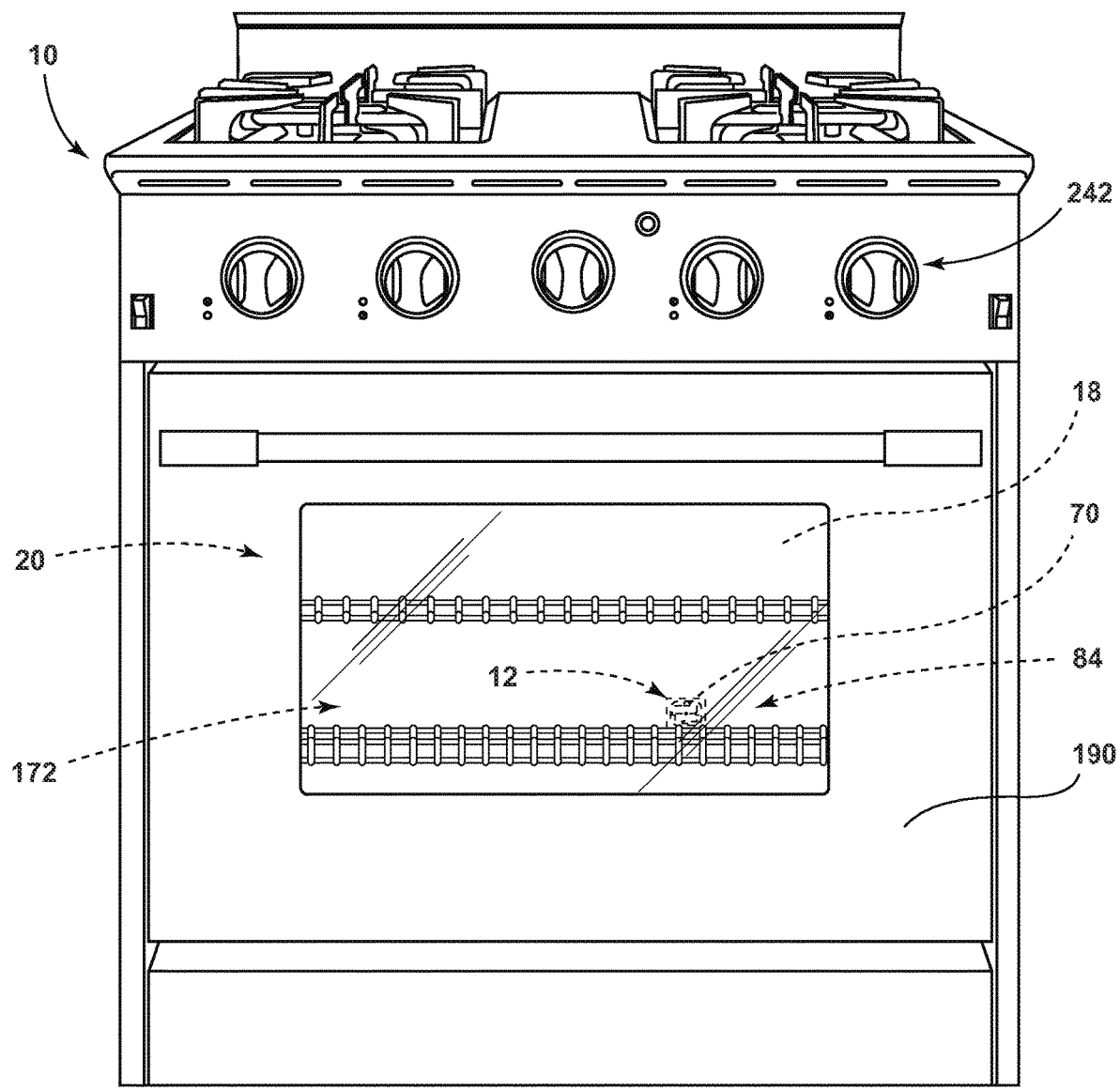
FIG. 1 is a front perspective view of the cooking appliance incorporating an aspect of the oven cavity connector.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-11, reference numeral 10 generally refers to a cooking appliance incorporating an aspect of the oven cavity connector 12 for providing electrical power to one or more powered accessory trays 14. According to the various embodiments, the cooking appliance 10 can include a plurality of sidewalls 16 and a rear wall 18 that define a heating cavity 20. At least one heat source 22 is in thermal communication with the heating cavity 20, where the at least one heat source 22 can include, but is not limited to, gas heat, convection heating, electrically resistive elements, electrically inductive elements, radiant heating, combinations thereof, and other similar heat sources 22 for use within the heating cavity 20 of the cooking appliance 10. An oven cavity connector 12 is disposed within an interior surface 24 of the heating cavity 20, where the oven cavity connector 12 is in communication with the heating cavity 20. In this manner, the oven cavity connector 12 is accessible by the user within the heating cavity 20. A first tray sliding structure 26 is disposed proximate opposing vertical sidewalls 28 of the plurality of sidewalls 16, and a second tray sliding structure 30 is disposed proximate the opposing vertical sidewalls 28, wherein the second tray sliding structure 30 is vertically offset relative to the first tray sliding structure 26.

According to the various embodiments, as exemplified in FIGS. 1-11, the first and second tray sliding structures 26, 30 can take the form of oven rack glides, drawer glides, oven rack supporting protrusions, and other similar rack supporting structures disposed within the heating cavity 20 of the cooking appliance 10. A powered accessory tray 14 is included for use in a cooking appliance 10 and includes a connecting plug 32. The powered accessory tray 14 is alternatively and selectively engaged with one of the first and second sliding tray structures 26, 30, or another tray sliding structure 34 of a plurality of tray sliding structures 34. When engaged with one of the first and second tray sliding structures 26, 30, the connecting plug 32 is in selective communication with the oven cavity connector 12 when the powered accessory tray 14 is engaged with any one of the tray sliding structures 34, such as the first and second tray sliding structures 26, 30.

Figure 2:
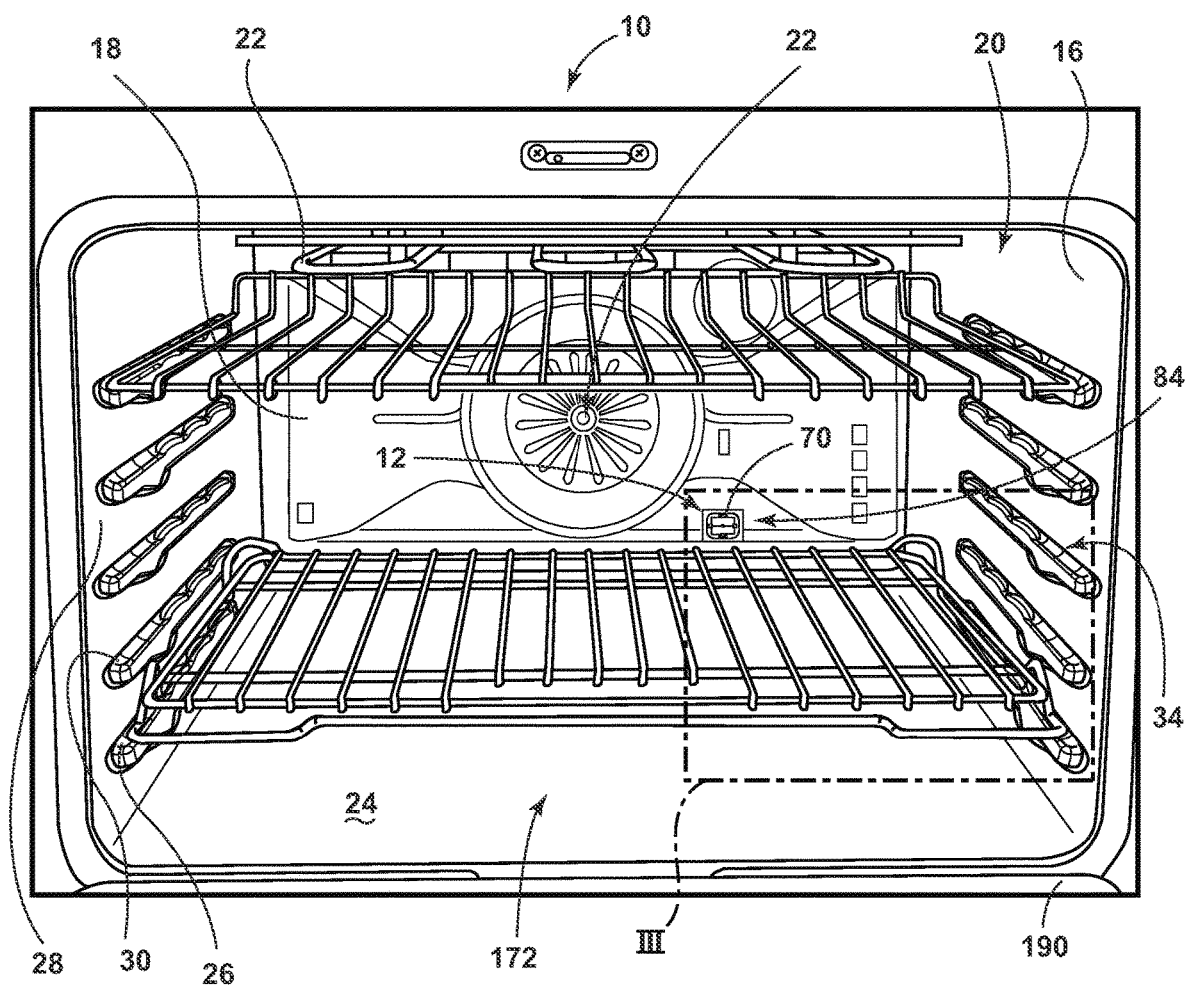
FIG. 2 is a front perspective view of the heating cavity of the cooking appliance of FIG. 1 with the appliance door in an open position.
Figure 3:
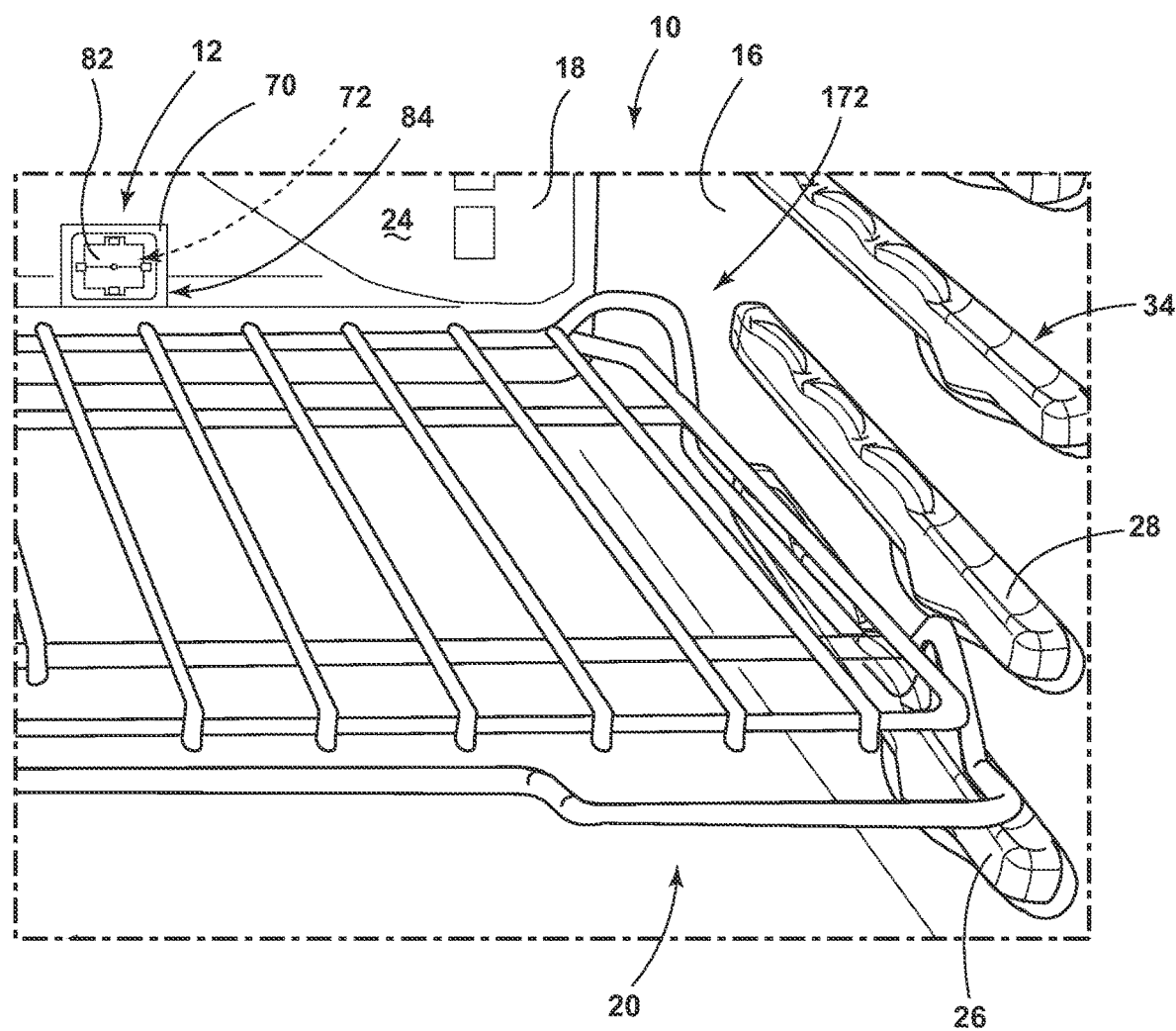
FIG. 3 is an enlarged perspective view of the oven cavity of FIG. 2 taken at area III.

According to the various embodiments, it is contemplated that the interior surface 24 of the heating cavity 20 can include tray sliding structures 34 that are vertically offset, such that multiple vertically positioned tray sliding structures 34 can be included within the heating cavity 20. In this manner, the powered accessory tray 14 can be engaged with any one of the tray sliding structures 34 to set the vertical aspect 38 of a tray position 40 of the powered accessory tray 14 for use in connection with the oven cavity connector 12 within the heating cavity 20 of the cooking appliance 10. By way of example, FIG. 2 illustrates five separate tray sliding structures 34 vertically disposed within the heating cavity 20 of the cooking appliance 10. It is contemplated that alternate numbers of tray sliding structures 34 can be disposed therein.

Referring again to FIGS. 2-8, it is contemplated that the oven cavity connector 12 can be disposed within a rear wall 18 of a heating cavity 20 of the cooking appliance 10. It is also contemplated that the heating cavity 20 can include a plurality of oven cavity connectors 12 disposed in various positions of the heating cavity 20 to be accessed when the powered accessory tray 14 is disposed in engagement with any one of the tray sliding structures 34. According to various embodiments, it is contemplated that each of the tray sliding structures 34 can be positioned in conjunction with a separate and dedicated oven cavity connector 12 positioned for providing electrical power to the powered accessory tray 14 when the powered accessory tray 14 is disposed in a corresponding tray sliding structure 34.

Referring again to FIGS. 2-9, it is contemplated that the powered accessory tray 14 can be used in conjunction with an extension cable 60 that extends between the powered accessory tray 14 and the oven cavity connector 12. When the powered accessory tray 14 is used in conjunction with the extension cable 60, the extension cable 60 is configured to maintain the powered accessory tray 14 in selective communication with the oven cavity connector 12. In such an embodiment, where the extension cable 60 is implemented, it is contemplated that the heating cavity 20 can include a single oven cavity connector 12 and the extension cable 60 provides at least electrical and signal communication between the oven cavity connector 12 and the powered accessory tray 14 as the powered accessory tray 14 is manipulated between a plurality of tray positions 40 within the heating cavity 20.

Referring again to FIGS. 2-4, the plurality of tray positions 40 are provided by the various tray sliding structures 34 disposed within the heating cavity 20 of the cooking appliance 10. According to the various embodiments, it is contemplated that the plurality of tray positions 40 can also include the lateral aspect 62 of the tray position 40 of the powered accessory tray 14 when slidably engaged with any one of the tray sliding structures 34, such as the first or second tray sliding structures 26, 30. The vertical and lateral aspects 38, 62 of the tray position 40 can include a plurality of vertical positions and/or a plurality of lateral positions of the powered accessory tray 14 within and proximate the heating cavity 20. Accordingly, it is contemplated that the powered accessory tray 14, through the use of the extension cable 60, can be set in any one of the plurality of tray positions 40 that can include the vertical aspects 38 set by the various tray sliding structures 34 as well as forward, rearward or other lateral aspects 62 within the heating cavity 20 as the user desires, or as required by the various design constraints of the powered accessory tray 14.

Referring again to FIGS. 2-9, it is contemplated that the oven cavity connector 12 can include a single connecting port 70 defined within the interior surface 24 of the heating cavity 20 that defines a connector interior 72 of the oven cavity connector 12. As discussed above, it is also contemplated that the oven cavity connector 12 can have multiple connecting ports 70 defined within the interior surface 24 of the heating cavity 20, with each connecting port 70 defining a separate connector interior 72. In such an embodiment, it is contemplated that the various connecting ports 70 of the oven cavity connector 12 can be positioned for use in conjunction with one or more of the various tray sliding structures 34 disposed within the heating cavity 20. It is also contemplated that in embodiments having multiple connecting ports 70, the extension cable 60 can be used in conjunction with the plurality of connecting ports 70 to assist the user in setting the lateral aspect 62 of the tray position of the powered accessory tray 14 within the heating cavity 20, where the lateral aspect 62 can include forward and rearward configurations as well as right and left configurations within the heating cavity 20 of the cooking appliance 10.

Referring again to FIGS. 5-9, it is contemplated that the oven cavity connector 12 can include at least one electrical contact 80 disposed within the connector interior 72 of the oven cavity connector 12. In such an embodiment, the oven cavity connector 12 can include at least one operable door 82 that selectively encloses the connector interior 72, when the at least one operable door 82 is in an idle state 84. Accordingly, the idle state 84 is further defined by the oven cavity connector 12 being disengaged with a connecting plug 32 of the powered accessory tray 14 or the extension cable 60 connected with the powered accessory tray 14. When the connecting plug 32 or the extension cable 60 is engaged with the oven cavity connector 12, the connecting plug 32/extension cable 60 is configured to bias the at least one operable door 82 into an engaged state 86, such that the electrical tabs 100 of the connecting plug 32 can engage the at least one electrical contact 80 disposed within the connector interior 72. When the connecting plug 32 is engaged with the oven cavity connector 12, the connecting plug 32 enters into the connector interior 72 and biases the at least one operable door 82 inward and toward a surface 88 of the connector interior 72 such that the connecting plug 32 can be inserted past the at least one operable door 82 and into the connector interior 72 and into engagement with the at least one electrical contact 80 of the oven cavity connector 12. According to the various embodiments, the oven cavity connector 12 can include a pair of opposing operable doors 82 that are each operable between the idle and engaged states 84, 86.

Figure 9:
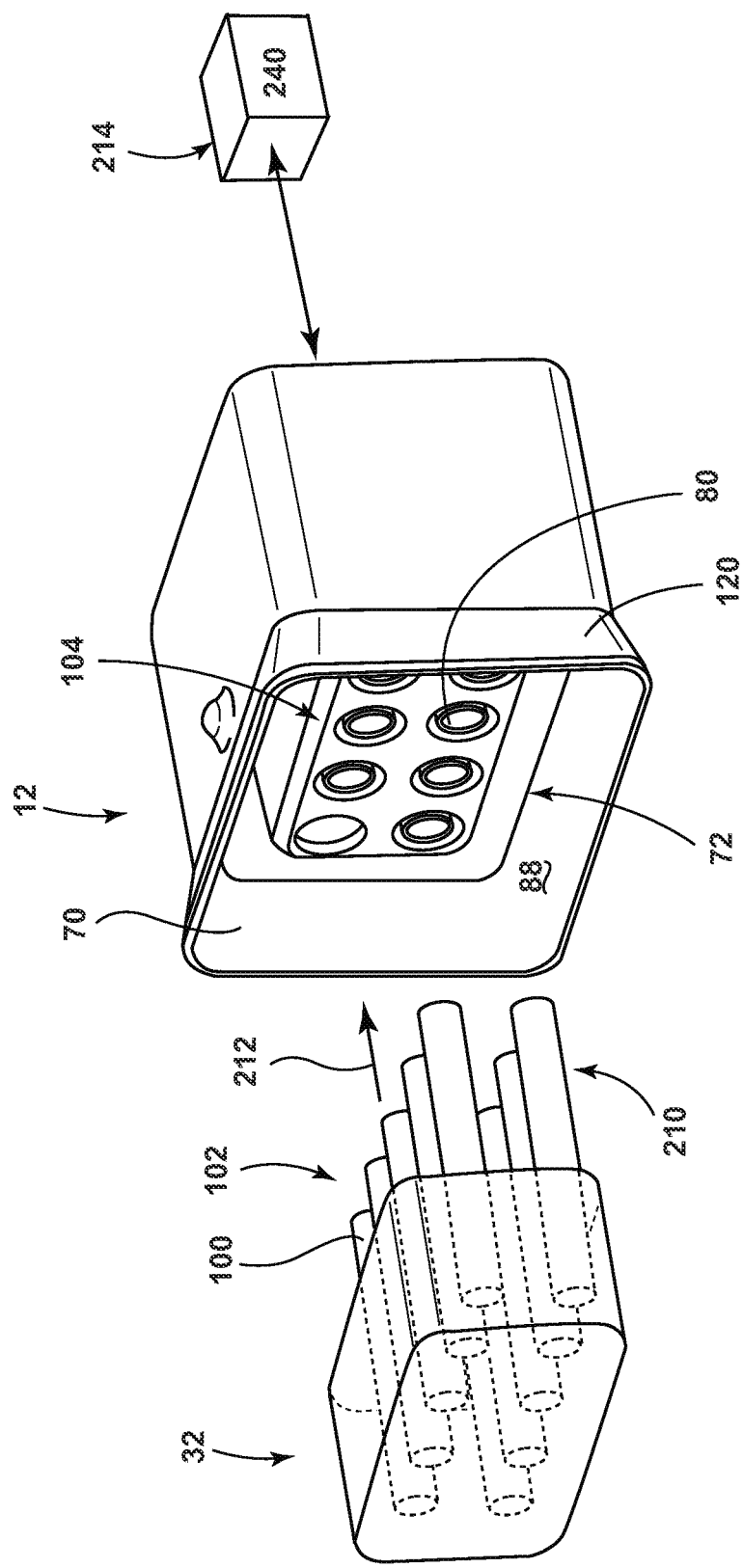
FIG. 9 is a front perspective view of an aspect of the oven cavity connector for installation within the oven cavity of a cooking appliance.
Figure 9A:
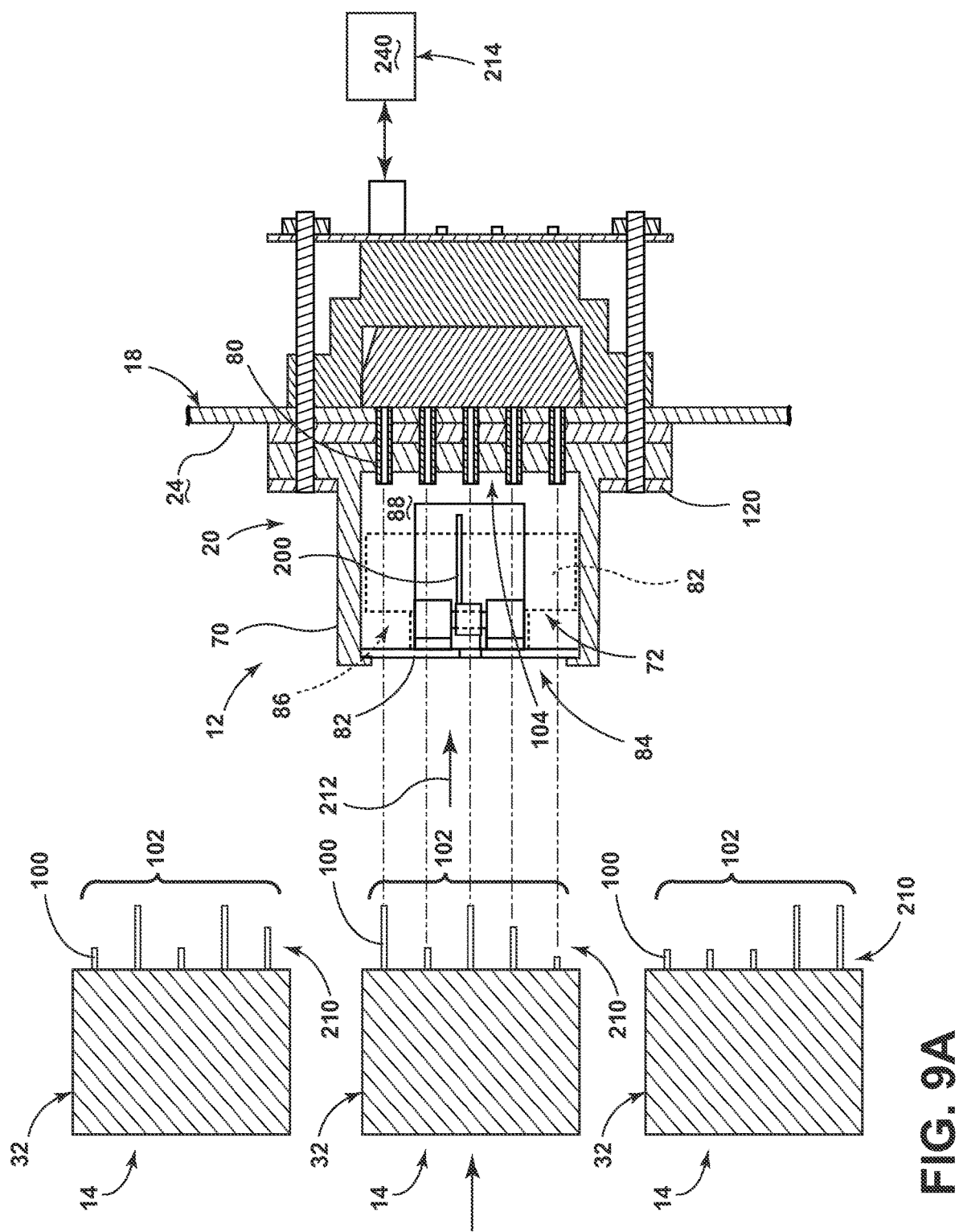
FIG. 9A is a schematic cross-sectional view of an aspect of the accessory detection mechanism.
Figure 9B:
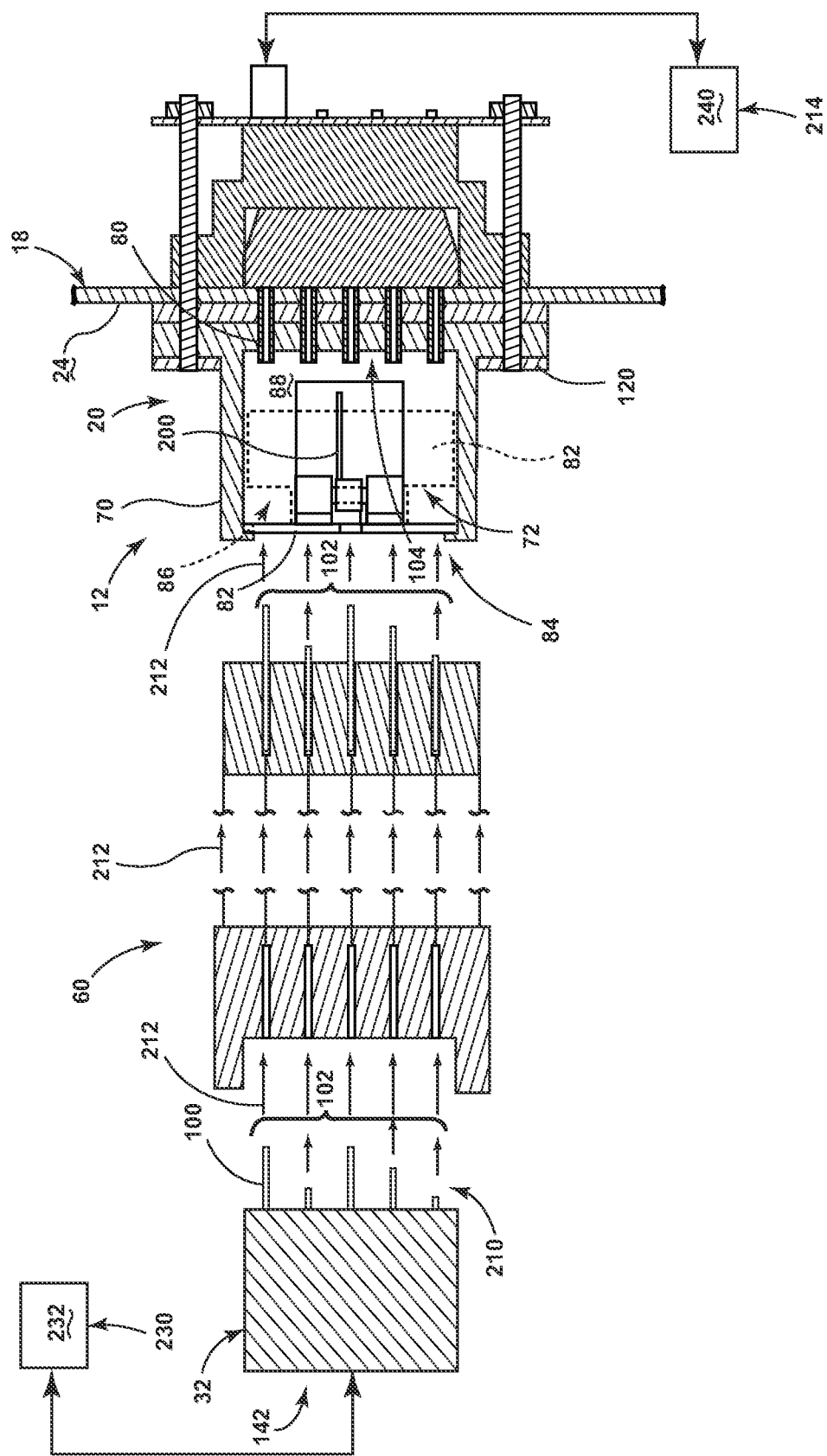
FIG. 9B is a schematic cross-sectional view of an aspect of the accessory detection mechanism incorporating an aspect of the extension cable.

According to the various embodiments, as exemplified in FIGS. 9-9B, the electrical contact 80 of the oven cavity connector 12 can include a plurality of electrical contacts 80 that correspond to the electrical tabs 100 of the connecting plug 32. It is also contemplated that the electrical tabs 100 of a particular connecting plug 32 for a corresponding powered accessory tray 14 can include a predetermined pattern 102 of electrical tabs 100. This predetermined pattern 102 of electrical tabs 100 engage the electrical contacts 80 of the plurality of electrical contacts 80 of the oven cavity connector 12. In this manner, the predetermined pattern 102 of electrical tabs 100 that engage only those electrical contacts 80 that correspond to the predetermined pattern 102. As such, the predetermined pattern 102 can serve to identify a particular powered accessory tray 14 of a plurality of powered accessory trays 14 that are alternatively and selectively engaged with the oven cavity connector 12. This configuration can serve as an accessory detection mechanism 104 disposed within the oven cavity connector 12 and will be described more fully below.

Referring again to FIGS. 2-9, it is contemplated that the oven cavity connector 12 can include a housing 120 made of a thermally insulating material such as ceramic, silicone, or other material that can withstand high temperatures such as those experienced during a pyrolytic self-cleaning cycle within the heating cavity 20. Within the various cooking appliances 10, such temperatures experienced during pyrolytic self-cleaning cycles can reach or exceed 900° F.

It is also contemplated that the electrical contacts 80 and electrical tabs 100 of the electric oven cavity connector 12 and connecting plug 32, respectively, can be a male/female connection and can be configured to be switched so that the electrical tabs 100 are within the oven cavity connector 12 and the electrical contacts 80 are disposed within the connecting plug 32. It is contemplated that the electrical terminals, including the electrical contacts 80 and electrical tabs 100 can be made of solid metal in the form of pins or blades and female terminal sockets having a high temperature resistive material wrapped around the female terminal to prevent relaxation from the high temperatures. It is contemplated that the electric terminals can be capable of handling electrical current in the approximate range of approximately 5 amps to approximately 15 amps that can correspond to ambient temperature ranges of approximately 0° F. to approximately 500° F.

According to the various embodiments, it is contemplated that the oven cavity connector 12 and connecting plug 32 can have a course and a fine lead-in feature to guide and align the two connectors as they are placed into the engaged position. The course lead-in feature on the accessory will also provide a protective shroud to further prevent contaminants from reaching the electrical contacts 80. The shroud can also include a detent feature that provides the user with a sensorial perception that the connecting plug 32 is fully engaged with the oven cavity connector 12. It is also contemplated that the extension cable 60 can also include materials that are substantially thermally resistive or thermally resistive to prevent damage that may be experienced by the extension cable 60 during use of the cooking appliance 10, or under such circumstances when the extension cable 60 is left within the oven cavity during a pyrolytic clean cycle of the cooking appliance 10.

Referring now to FIGS. 1-17, it is contemplated that the powered accessory tray 14 can include a base pan 130 and a resistive heating element 132, wherein the base pan 130 is in selective communication with any one of the tray sliding structures 34. It is contemplated that the resistive heating element 132 of the powered accessory tray 14 can be placed in selective communication with the oven cavity connector 12. In this manner, as the powered accessory tray 14 is engaged with one of the tray sliding structures 34, the engaged or connected powered accessory tray 14 can be moved to any of the lateral aspects 62 of the tray positions 40 within the oven cavity and engaged with the oven cavity connector 12. Accordingly, the powered accessory tray 14 can be placed in communication with the cooking appliance 10 via the oven cavity connector 12. In embodiments having a single oven cavity connector 12, it is contemplated that the extension cable 60 can be used to place the resistive heating element 132 in communication with the oven cavity connector 12, regardless of the vertical, horizontal or lateral tray position 40 of the powered accessory tray 14 within the heating cavity 20. Alternatively, each tray sliding structure 34 can be placed proximate a dedicated connecting port 70 of the oven cavity connector 12.

Referring again to FIGS. 2-17, it is contemplated that the base pan 130 for the powered accessory tray 14 can be used in conjunction with various accessory inserts 140. These accessory inserts 140 can include, but are not limited to, a grilling insert 142, a cooking stone insert, a steaming insert 146, a smoker insert 390, a rotisserie insert 148, a canning insert, a pressure cooking insert, a slow cooker insert, an internal convection insert, sous-vide heater, a deep-frying insert, an air-frying insert, an air roaster insert, an air-crisper insert, a dedicated heating chamber insert, combinations thereof, and other similar inserts. It is contemplated that at least a portion of the accessory inserts 140 can be used in combination with the resistive heating element 132.

According to the various embodiments, it is contemplated that each of the accessory inserts 140 can be used in conjunction with a dedicated powered accessory tray 14, such that each of the at least one powered accessory tray 14 can have a dedicated insert used only for that powered accessory tray 14, or the plurality of powered accessory trays 14 can include a set of powered accessory trays 14 that each include a corresponding set of dedicated accessory trays that are interchangeable with respect to a particular powered accessory tray 14. It is contemplated that each of the powered accessory trays 14 used in conjunction with the oven cavity connector 12 can have a particular set of functions that is used in conjunction with the particular powered accessory tray 14.

By way of example, and not limitation, as exemplified in FIGS. 2-19, a powered accessory tray 14 having a resistive heating element 132 can be used interchangeably with a grilling insert 142, a baking stone insert 144, a steaming insert 146, and other similar accessory inserts 140 that can be used in conjunction with a resistive heating element 132. Similarly, a separate powered accessory tray 14 can be used in conjunction with various functions of rotisserie insert 148 where the oven cavity connector 12 powers a rotating motor assembly 158 in conjunction with a spit 160, rotisserie cage 162, or other rotisserie mechanism that is used in conjunction with the heat source 22 for the cooking appliance 10. It is also contemplated that a powered accessory tray 14 having the motor assembly 158 can also include a resistive heating element 132 such that the oven cavity connector 12 can be engaged with the powered accessory tray 14 for powering the resistive heating element 132 and the rotisserie motor assembly 158 of the rotisserie insert 148, or other motorized accessory insert 140. Additionally, other powered accessory trays 14 can include air-heating functions such that the powered accessory tray 14 can define an air fryer and/or a convection heating zone within or adjacent to a portion of the powered accessory tray 14.

According to the various embodiments, as exemplified in FIGS. 1-26, it is contemplated that each powered accessory tray 14 can include an accessory heating region 170 positioned adjacent the powered accessory tray 14. In the case of a powered accessory tray 14 having a resistive heating element 132, the accessory heating region 170 may be at least partially disposed above the resistive heating element 132 and within the heating cavity 20 such that the heating cavity 20 includes a primary heating region 172 that is disposed adjacent to the at least one heat source 22 for the cooking appliance 10. Similarly, the powered accessory tray 14 having air-based attachments can define an accessory heating region 170 positioned within the convection area of the air-based attachment.

According to the various embodiments, as exemplified in FIGS. 1-26, it is contemplated that the accessory heating region 170 may be at least partially separated from the primary heating region 172 of the cooking appliance 10 such that the heat source 22 may provide heat to the primary heating region 172 and the powered accessory tray 14 may provide heat to the accessory heating region 170 defined proximate the powered accessory tray 14. Accordingly, it is contemplated that the heating cavity 20 of the cooking appliance 10 can be separated into multiple heating zones or regions for cooking separate items at different temperatures within the same heating cavity 20 of the cooking appliance 10. According to the various embodiments, it is contemplated that various thermal partitions 180 (exemplified in FIG. 4) can be disposed within the heating cavity 20 of the cooking appliance 10 to further separate the heating cavity 20 into the accessory heating region 170 defined by the powered accessory tray 14 and the primary heating region 172 defined by the remainder of the heating cavity 20 that is heated by the heat source 22 of the cooking appliance 10.

Referring again to FIGS. 1-26, the cooking appliance 10 that includes a plurality of sidewalls 16 and an appliance door 190 can include an interior surface 24 of the heating cavity 20 that is defined by the plurality of sidewalls 16. The at least one heat source 22 can be disposed in thermal communication with the heating cavity 20. The oven cavity connector 12 can be positioned within at least one of the plurality of sidewalls 16, wherein the oven cavity connector 12 can include a plurality of electrical contacts 80 disposed within the connector interior 72. The connector interior 72 of the oven cavity connector 12 is in communication with the heating cavity 20 such that the electrical contacts 80 are accessible from within the heating cavity 20. It is contemplated that the at least one operable door 82 of the oven cavity connector 12 can be configured to selectively enclose the connector interior 72 when the at least one operable door 82 is in an idle state 84. The at least one operable door 82 can be biased toward the idle state 84 by a biasing mechanism 200, such as a spring, living hinge, tensioned mechanism, or other biasing mechanism 200. The at least one operable door 82 is adapted to be biased inward into the connector interior 72 and toward an engaged state 86 when the connecting plug 32 of one of the powered accessory trays 14 is engaged with the oven cavity connector 12. As discussed above, the at least one operable door 82 can include a pair of opposing operable doors 82. Each of the operable doors 82 of the oven cavity connector 12 can be made of a thermally resistive material, such as ceramic, silicone, rubber, various polymers, combinations thereof, or other similar thermally resistive material that can provide a thermal barrier between the connector interior 72 of the oven cavity connector 12 and the heating cavity 20. In this manner, the pair of opposing operable doors 82 in the idle state 84 limits thermal transfer between the heating cavity 20 and the connector interior 72 to provide thermal protection for the plurality of electrical contacts 80 disposed within the connector interior 72.

It is contemplated that in various embodiments, the cavity connector 12 can be installed within the cooking appliance 10 either during or after manufacture. When installed after manufacture, it is contemplated that a spacer or plug can be installed within the heating cavity 20 of the appliance 10. When the cavity connector 12 is installed, the spacer or plug can be removed and the cavity connector 12 inserted to be engaged, attached or otherwise placed in communication with the various electrical, communications and/or user interface systems of the appliance 10.

Referring again to FIGS. 2-26, it is contemplated that the oven cavity connector 12 can include an accessory detection mechanism 104. The accessory detection mechanism 104 can be configured to selectively engage an identifier portion 210 disposed on a connecting plug 32 of a corresponding powered accessory tray 14 of the plurality of powered accessory trays 14. In this manner, engagement of the connecting plug 32 of the powered accessory tray 14 with the oven cavity connector 12 can place the accessory detection mechanism 104 in communication with the identifier portion 210 of the connecting plug 32 to transfer indicative data 212 of a corresponding engaged or connected powered accessory tray 14 from the identifier portion 210 to the accessory detection mechanism 104. It is contemplated that the indicative data 212 of a corresponding engaged or connected powered accessory tray 14 can be used to set a predetermined operational parameter 214 of the at least one heat source 22 of the cooking appliance 10.

By way of example, and not limitation, the identifier portion 210 of a connecting plug 32 can be the predetermined pattern 102 of electrical tabs 100 disposed within the connecting plug 32 of the powered accessory tray 14. As discussed above, the predetermined pattern 102 of electrical tabs 100 can engage the electrical contacts 80 disposed within the oven cavity connector 12 to transfer the indicative data 212 of the predetermined pattern 102 of electrical tabs 100. This predetermined pattern 102 of electrical tabs 100 engaging only those electrical contacts 80 corresponding to the predetermined pattern 102 can activate a predetermined operational parameter 214 of the cooking appliance 10 corresponding to the powered accessory tray 14. The pattern of electrical tabs 100 can also communicate the indicative data 212 of the corresponding powered accessory tray 14 to the cooking appliance 10. This indicative data 212 can be used to set the operational parameters 214 of the heat source 22 of the cooking appliance 10, such that the heat source 22 can be configured to operate in conjunction with the corresponding powered accessory tray 14 through the engagement of the powered accessory tray 14 with the oven cavity connector 12.

According to the various embodiments, as exemplified in FIG. 9B, it is contemplated that the accessory detection mechanism 104 can also include a geometric indicia or surface pattern disposed on the connecting plug 32 to define the identifier portion 210. This surface pattern can engage the identifier portion 210 of the oven cavity connector 12 to manipulate the identifier portion 210 in a predetermined pattern 102 corresponding to the surface pattern of the connecting plug 32. The manner in which the identifier portion 210 of the oven cavity connector 12 is manipulated by the surface pattern corresponds to the identity of the particular powered accessory tray 14.

According to the various embodiments, it is contemplated that the accessory detection mechanism 104 can be communicated through the extension cable 60 such that when one end of the extension cable 60 is connected with the connecting plug 32 of the powered accessory tray 14, the identifier portion 210 of the connecting plug 32 can be exemplified through the extension cable 60 in the opposing end of the extension cable 60 that engages the oven cavity connector 12. Accordingly, the identifier portion 210 can engage the accessory detection mechanism 104 of the oven cavity connector 12 via the extension cable 60.

According to the various embodiments, where the identifier portion 210 of the connecting plug 32 includes the predetermined pattern 102 of electrical tabs 100, the pattern of electrical tabs 100 of the connecting plug 32 can be biased through the extension cable 60 to extend certain electrical tabs 100 of the extension cable 60 corresponding to the predetermined pattern 102 of electrical tabs 100. The predetermined pattern 102 of electrical tabs 100 can be exemplified in the opposing end of the extension cable 60 such that the same electrical tabs 100 within the extension cable 60 are protruded so that the end of the extension cable 60 corresponds to the same identifier portion 210 as that of the powered accessory tray 14. A similar mechanism can be utilized for transferring a geometric pattern or surface condition through the extension cable 60.

According to the various embodiments, as exemplified in FIGS. 9-9B, the information corresponding to the operational parameters 214 of each of the powered accessory trays 14 can be stored within the cooking appliance 10 such that the engagement of the connecting plug 32 of the powered accessory tray 14 only informs the appliance which accessory tray is engaged so that the operational parameters 214 of the cooking appliance 10 can be activated to correspond to the powered accessory tray 14. It is also contemplated that each of the powered accessory trays 14 can include operational instructions 230 within an accessory control 232 disposed within each of the powered accessory trays 14. In this manner, when the particular powered accessory tray 14 is engaged with the oven cavity connector 12, the corresponding operational instructions 230 can be communicated to the cooking appliance 10 for setting the predetermined operational parameters 214 for the heat source 22 of the cooking appliance 10.

According to the various embodiments, as exemplified in FIGS. 1-26, where the predetermined operational parameters 214 of the plurality of powered accessory trays 14 are stored within a portion of the cooking appliance 10, a control unit 240 of the cooking appliance 10 can be in communication with the oven cavity connector 12 and the user interface 242 of the cooking appliance 10. In such an embodiment, when the powered accessory tray 14 is placed in communication with the oven cavity connector 12, the identifier portion 210 of the connecting plug 32 communicates the indicative data 212 of a corresponding powered accessory tray 14 through the accessory detection mechanism 104 and to the control unit 240 of the cooking appliance 10. The control unit 240, upon receiving the indicative data 212 from the powered accessory tray 14, places the control unit 240 and the user interface 242 of the cooking appliance 10 in signal communication with the powered accessory tray 14. In this manner, when the powered accessory tray 14 is placed in communication with the cooking appliance 10, the powered accessory tray 14 can be operated by the user interface 242 of the cooking appliance 10.

It is contemplated that the operational parameters 214 of the cooking appliance 10 and/or the operational instructions 230 of the powered accessory tray 14 can be predetermined or preset within the control unit 240, or can be manually operated by the user through use of the user interface 242 of the cooking appliance 10. By way of example, and not limitation, where the powered accessory tray 14 having a grilling insert 142 is used within the heating cavity 20, the user can operate the grilling insert 142 by manipulating the user interface 242 for the cooking appliance 10 by setting a dedicated temperature for the powered accessory tray 14 that may be the same or separate from the level of heat provided by the heat source 22 for the cooking appliance 10.

Figure 4:
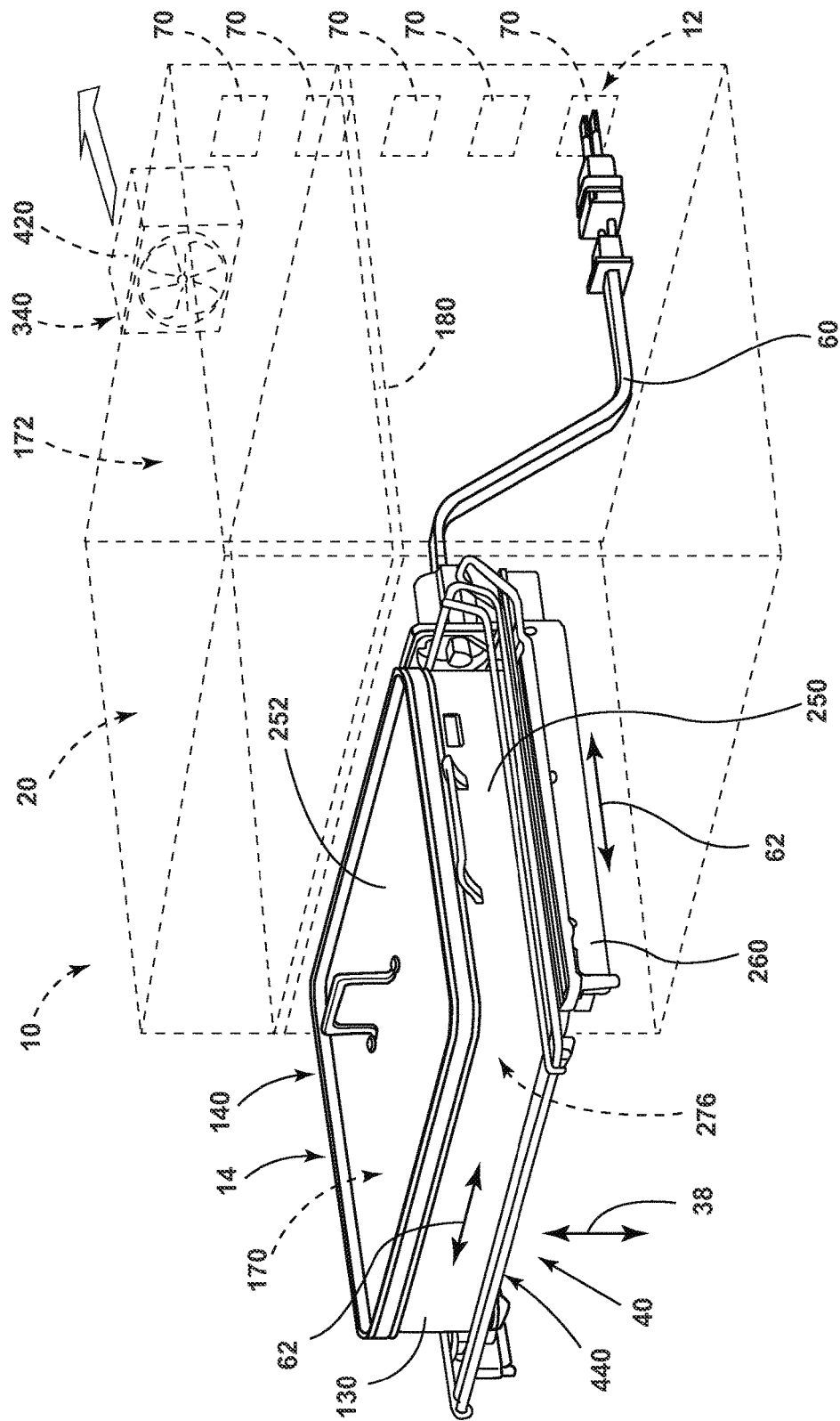
FIG. 4 is a side perspective view of an aspect of a powered accessory tray used in conjunction with an aspect of the oven cavity connector for a cooking appliance.
Figure 5:
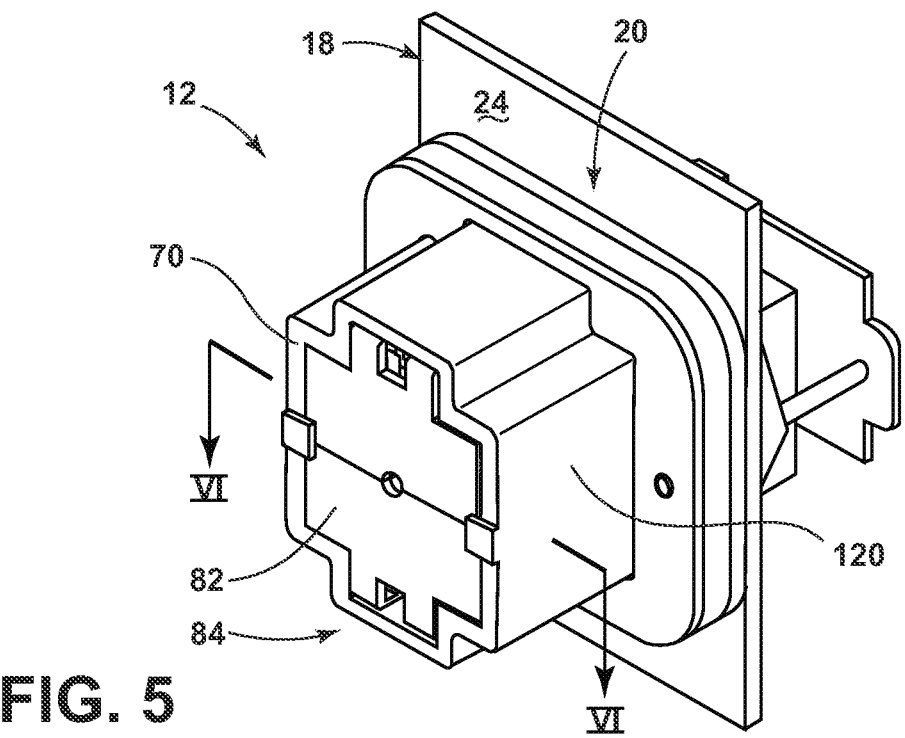
FIG. 5 is a perspective view of an aspect of the oven cavity connector.
Figure 6:
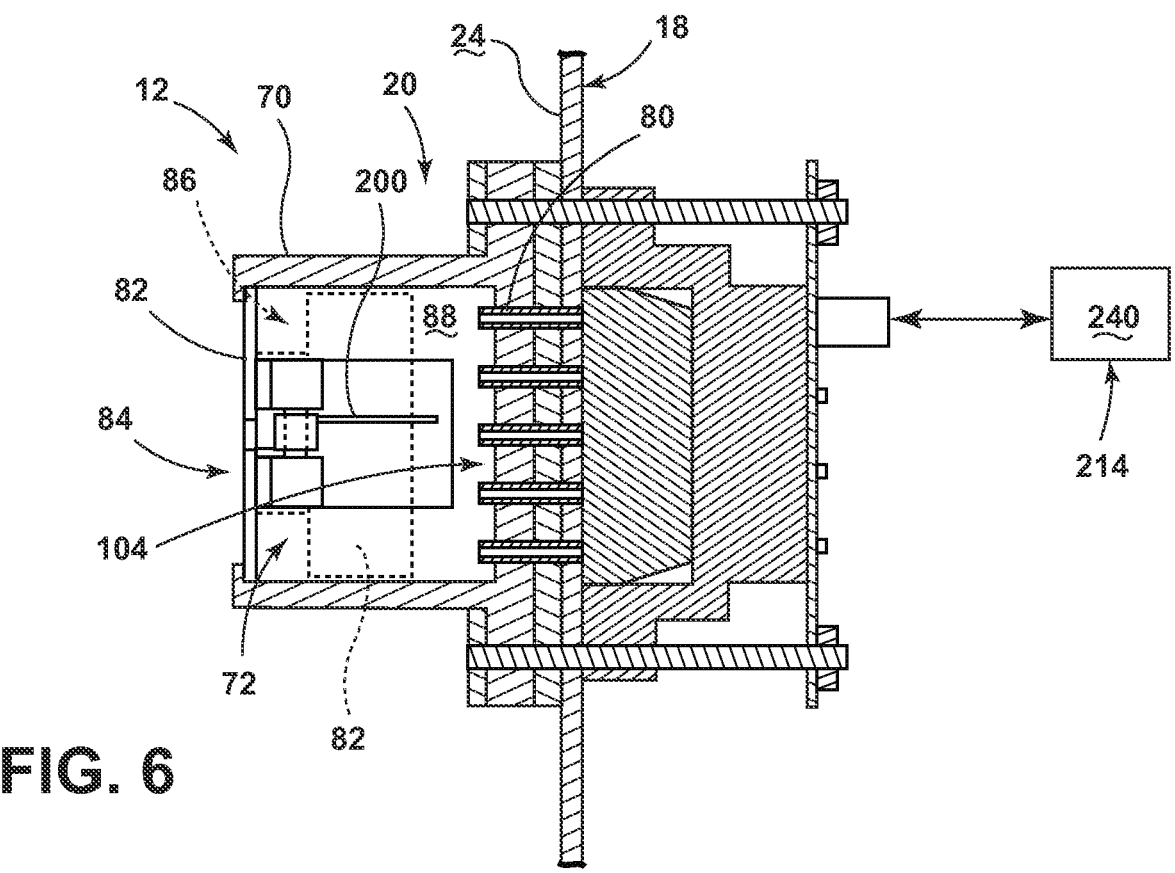
FIG. 6 is a cross-sectional view of the oven cavity connector of FIG. 5 taken along line VI-VI.
Figure 7:
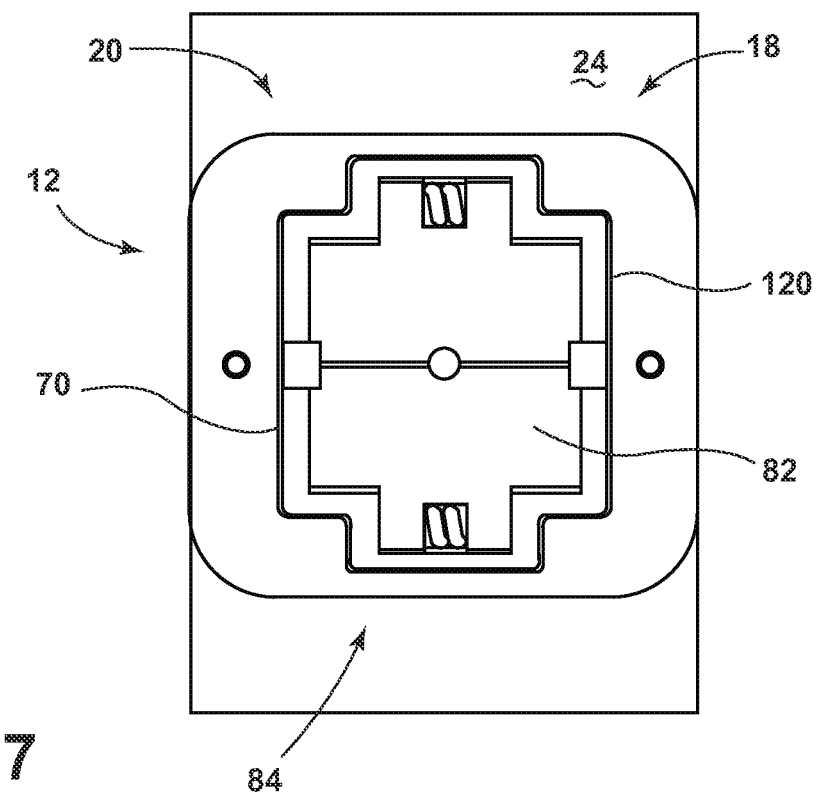
FIG. 7 is a front elevational view of the oven cavity connector of FIG. 5.
Figure 8:
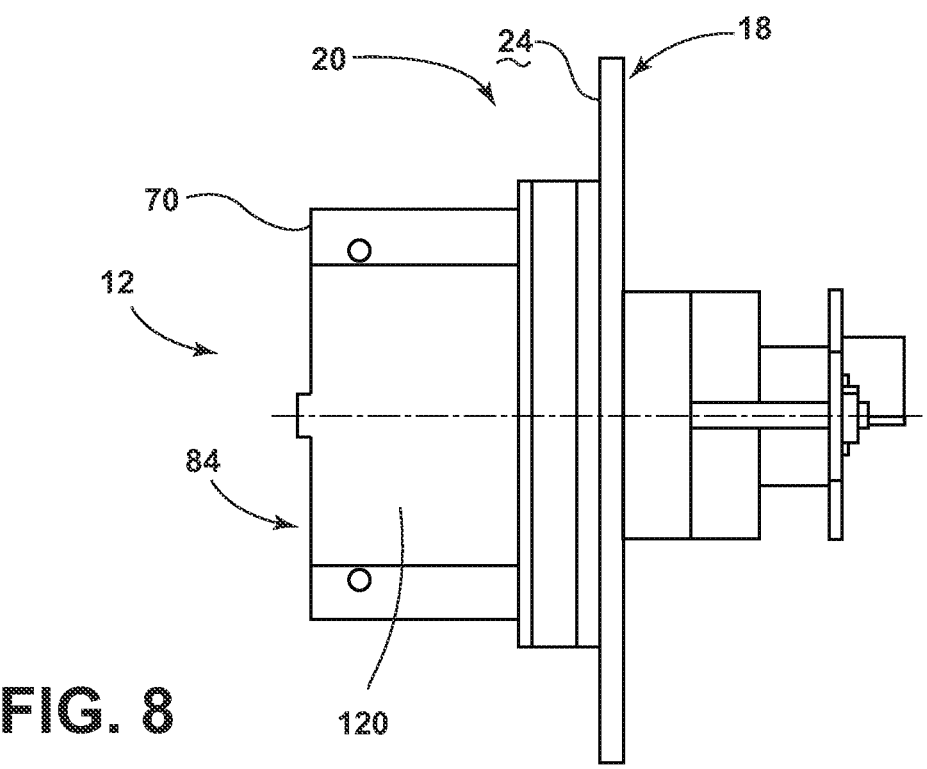
FIG. 8 is a side elevational view of the oven cavity connector of FIG. 5.

Referring to the aspect of the device as exemplified in FIG. 4, it is contemplated that the various powered accessory trays 14 can include sidewalls 250 and a removable lid 52 that can be used to sequester the accessory heating region 170 from the remainder of the heating region 172 defined within the heating cavity 20 of the cooking appliance 10. As discussed above, thermal partitions 180 can also be disclosed within the heating cavity 20 for segregating the accessory heating region 170 defined proximate the powered accessory tray 14 from the remainder of the heating cavity 20 that defines the primary heating region 172 of the cooking appliance 10.

Figure 10:
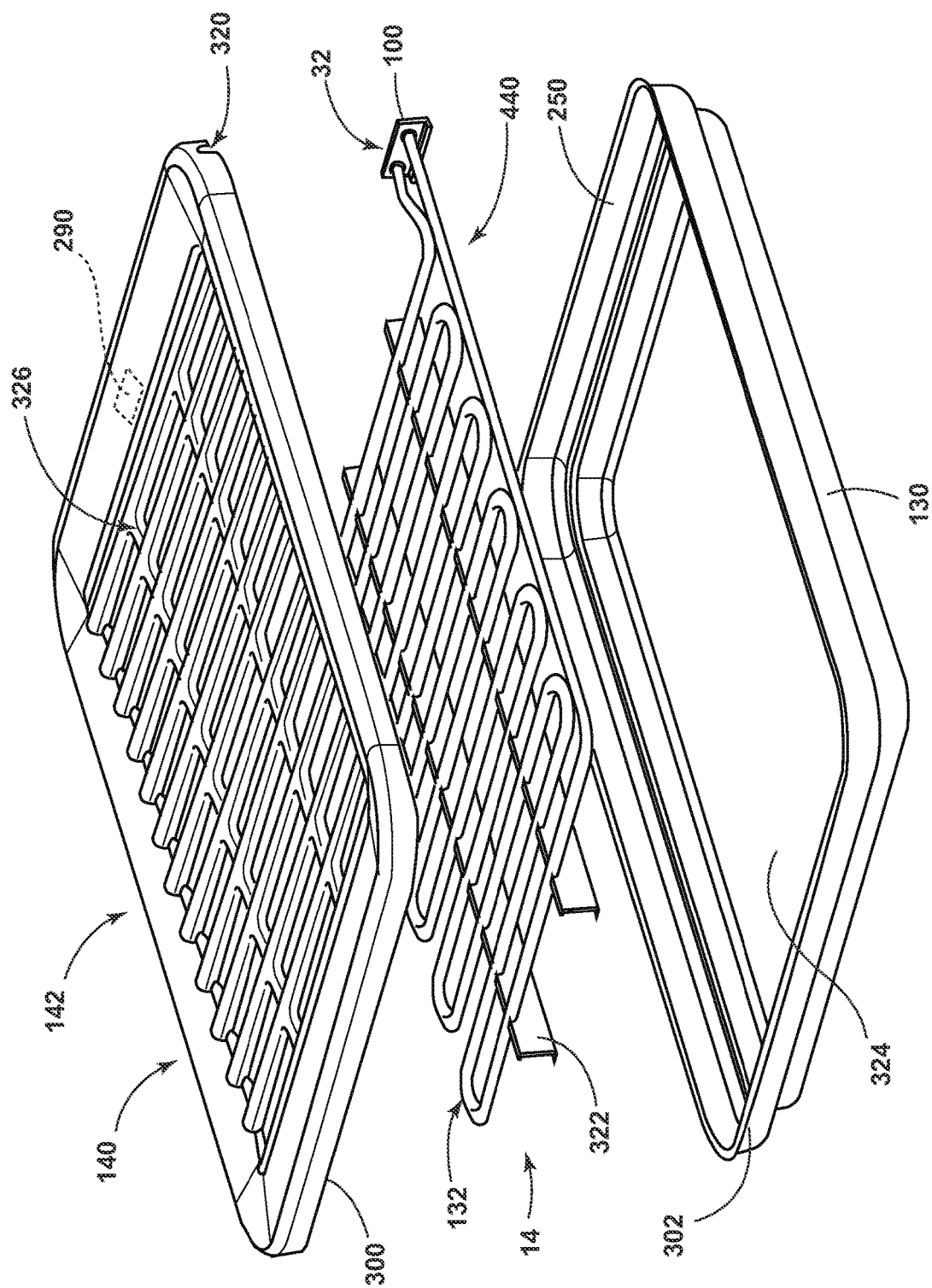
FIG. 10 is an exploded perspective view of an aspect of a powered accessory tray having a grilling insert.
Figure 11:
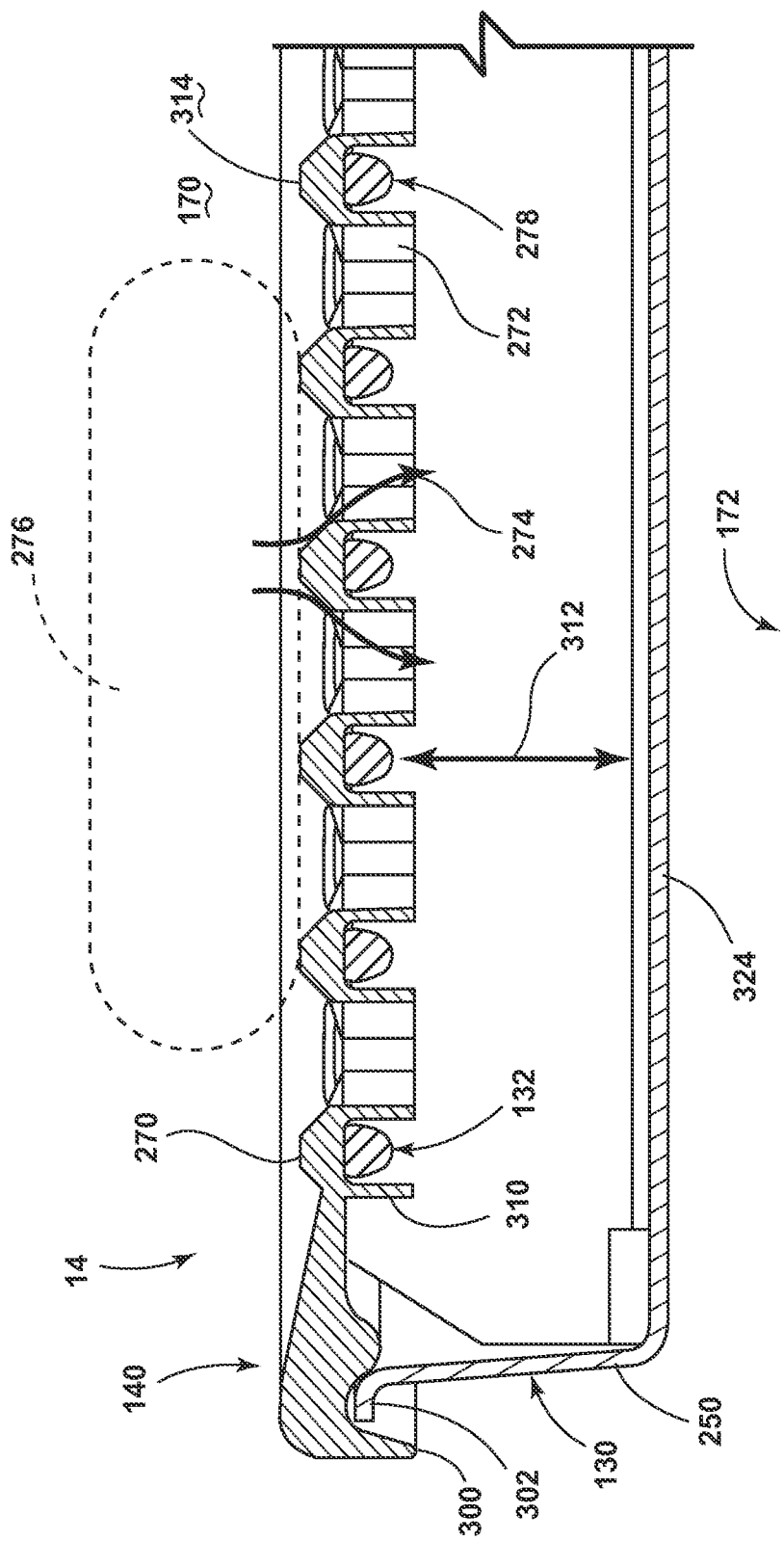
FIG. 11 is a cross-sectional view of a powered accessory tray having a grilling insert.

Referring now to the various aspects of the device as exemplified in FIGS. 10 and 11, it is contemplated that at least one of the powered accessory trays 14 can include the base pan 130 and the resistive heating element 132. In such an embodiment, the base pan 130 or tray can be placed in selective communication with any one of the tray sliding structures 34. It is also contemplated that the resistive heating element 132 can be placed in selective communication with the oven cavity connector 12. According to the various embodiments, the connecting plug 32 of the powered accessory tray 14 that can be disposed at an end of the resistive heating element 132. It is also contemplated that the base tray can include tray slides 260 that are selectively engageable with the various tray sliding structures 34. In this manner, the tray slides 260 can be selectively secured to one of the tray sliding structures 34, such that the powered accessory tray 14 can be laterally moved forward and rearward within the heating cavity 20 to access an interior of the powered accessory tray 14 for manipulating various food items 276 that are being cooked, or for positioning the powered accessory tray 14 within the heating cavity 20, for example, to avoid certain hot spots within the heating cavity 20 or for placing the powered accessory tray 14 within desired vertical or lateral aspects 38, 62 of the tray position 40 of the heating cavity 20.

Referring to FIG. 11, it is contemplated that the grilling insert 142 for the powered accessory tray 14 can include a plurality of grates 270 having drain channels 272 defined between the grates 270. The base pan 130 of the powered accessory tray 14 can be used to receive drippings 274 and other food material that may drop off of the food items 276 being cooked. In this manner, the drippings 274 can be saved for later use or disposed after cooking is completed. According to the various embodiments, each of the grates 270 can include heating element receptacles 278 that are configured to rest directly upon the resistive heating element 132. In this manner, heat from the resistive heating element 132 can be thermally communicated through the grates 270 and directly to the food item 276 placed upon each of the grates 270 of the grilling insert 142. Accordingly, the temperature of the grilling insert 142 during use of the powered accessory tray 14 can be controlled to a substantially high degree of precision to maintain a desired temperature within the accessory heating region 170 positioned above the resistive heating element 132.

Referring again to FIGS. 10 and 11, it is contemplated that the grates 270 can include a thermostat, thermocouple, thermistor, or other temperature sensing device 290 that can measure the temperature of the accessory heating region 170. The temperature sensing device 290 can then communicate the temperature of the accessory heating region 170 to the user through a user interface 242 dedicated for the powered accessory tray 14, or through the user interface 242 of the cooking appliance 10, depending upon the configuration of the cooking appliance 10. It is contemplated that the temperature sensing device 290 can be imbedded within a portion of the grilling insert 142, or can be attached to a surface of the grilling insert 142.

Referring again to FIGS. 10 and 11, it is contemplated that an outer rim 300 of the grilling insert 142 can extend over an outer edge 302 of the base pan 130 to provide a secure fit for the grilling insert 142. It is also contemplated that the grilling insert 142 can have an outer rim 300 that fits within the outer edge 302 of the base pan 130, such that the base pan 130 substantially surrounds the grilling insert 142. Accordingly, substantially all of the drippings 274 from the food item 276 being cooked on the grilling insert 142 are allowed to fall within the base pan 130 for collection and later use or disposal. As discussed previously, the base pan 130 is configured to selectively and alternatively engage the various tray sliding structures 34 of the cooking appliance 10 and the base pan 130 is configured to align the connecting plug 32 of the resistive heating element 132 for direct engagement with the oven cavity connector 12. As discussed previously, it is also contemplated that the extension cable 60 can be used in conjunction with the connecting plug 32 for engaging the resistive heating element 132 with the oven cavity connector 12 to set a variety of vertical and lateral aspects 38, 62 of tray positions 40.

Referring again to FIG. 11, it is contemplated that the cover flanges 310 of the grilling insert 142 that extend downward from the grates 270 can be configured to shroud portions of the resistive heating element 132 to substantially avoid contact between the resistive heating element 132 and dripped grease. In this manner, the cover flanges 310 surrounding the portions of the resistive heating element 132 can substantially avoid smoke generation and/or flare-ups during use of the powered accessory tray 14. It is also contemplated that the base pan 130 can be of a predetermined height 312 such that drippings 274 that fall within the base pan 130 are substantially prevented from splashing upward and engaging a bottom portion of the resistive heating element 132 during use of the powered accessory tray 14.

According to the various embodiments, the grilling insert 142 can be made of various metallic materials that are substantially thermally conductive to allow for transfer of heat from the resistive heating element 132 to the grates 270 of the grilling insert 142. Such materials can include, but are not limited to, aluminum, cast iron, steel, ceramic, and other similar thermally conductive materials that can be used to transfer heat from the resistive heating element 132 to the top surface 314 of the grates 270 to heat the accessory heating region 170 of the powered accessory tray 14. It is also contemplated that the grill insert can include a non-stick coating that can be used in conjunction with metal utensils, such that the non-stick coating does not scrape away when metal utensils are used in conjunction with the grilling insert 142.

According to the various embodiments, the grilling insert 142 can include a receptacle region 320 that can engage a portion of the connecting plug 32 to position the connecting plug 32 in a position relative to the base pan 130 that is designed to directly engage the oven cavity connector 12 when the base pan 130 is engaged with a particular tray sliding structure 34 of the heating cavity 20. It is also contemplated that the resistive heating element 132 can include spacing members 322 that are configured to support the resistive heating element 132 from below, wherein the spacing members 322 are configured to engage the bottom plate 324 of the base pan 130 and support the resistive heating element 132 from below such that the load exerted upon the grilling insert 142 by the food item 276 can be transferred through the spacing members 322, rather than through the resistive heating element 132. It is also contemplated that the grilling insert 142 can include spacer receptacles 326 between the grates 270 to receive the spacing members 322 and to provide consistent support throughout the grilling insert 142.

According to the various embodiments, it is contemplated that the grilling insert 142 can be used in conjunction with a ventilation system 340 exemplified schematically in FIG. 4 for the cooking appliance 10, such that smoke, fumes, and other gaseous or particulate matter that may be generated can be vented from the heating cavity 20 and away from areas around the cooking appliance 10 that may be occupied by users of the cooking appliance 10.

Figure 12:
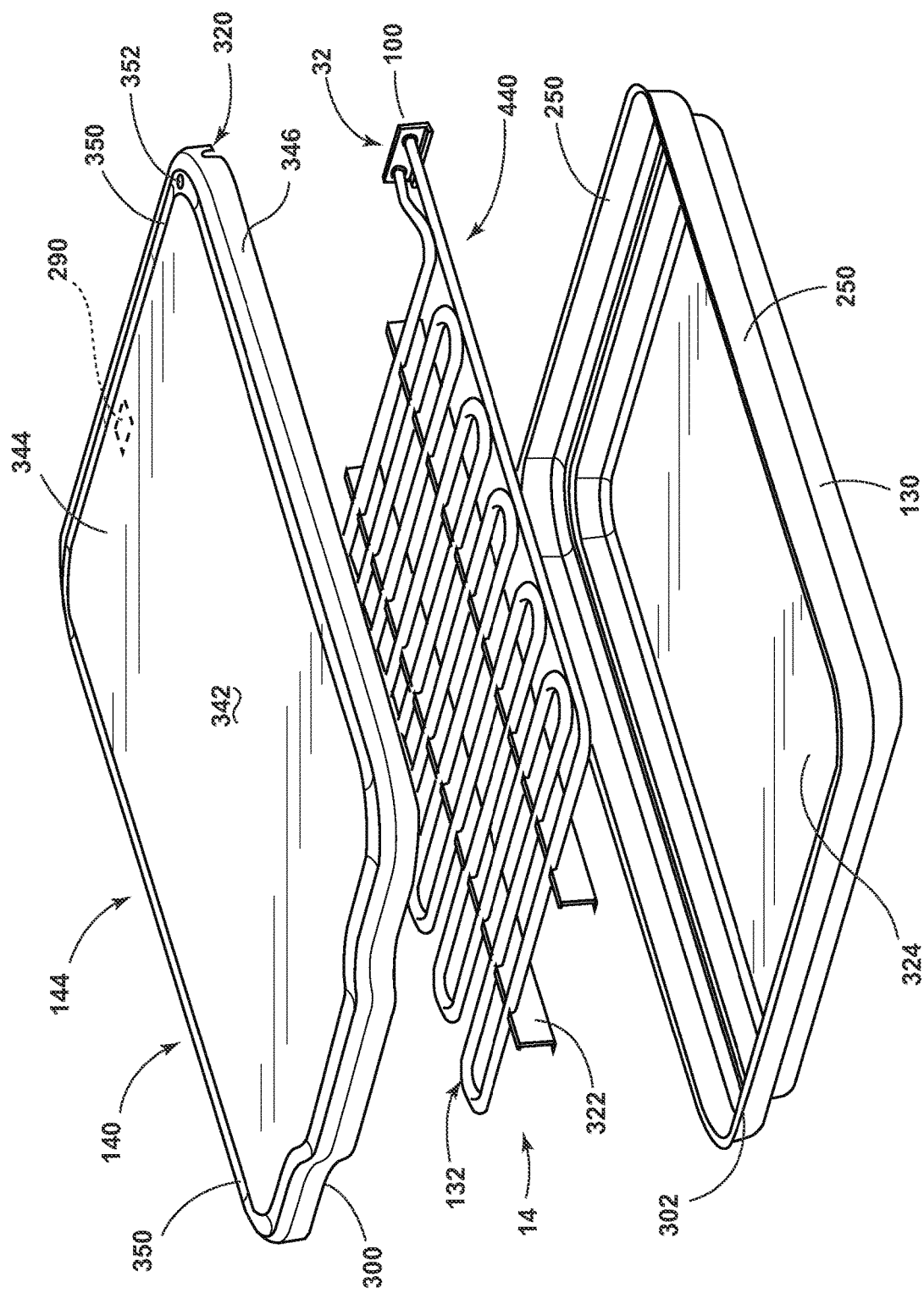
FIG. 12 is an exploded perspective view of a powered accessory tray having a baking stone insert.

Referring now to an aspect of the device as illustrated in FIG. 12, it is contemplated that the powered accessory tray 14, having the base pan 130 and the resistive heating element 132, can include a baking stone insert 144 that can be placed on top of the resistive heating element 132. The baking stone insert 144 can include a planar surface 342 that can have a glazed layer 344 provided thereon for easy cleaning and even temperature distribution throughout the baking stone insert 144. It is also contemplated that the baking stone insert 144 can be sized such that the outer perimeter 346 of the baking stone insert 144 can seat within the outer edge 302 of the base pan 130 such that the entire baking stone insert 144 or substantially all of the baking stone insert 144 can fit within the base pan 130 to catch drippings 274 and other food materials that may fall away from the top surface of the baking stone insert 144. In order to provide substantially precise temperature management of the accessory heating region 170 positioned above the resistive heating element 132, a temperature sensing device 290 can be embedded within the baking stone insert 144 or placed upon the planar surface 342 of the baking stone insert 144, or other surface thereof, to measure the temperature of the accessory heating region 170. As with the temperature sensing device 290 for the grilling insert 142, the temperature sensing device 290 for the baking stone insert 144 can include a thermostat, thermocouple, thermistor, or other similar temperature sensing mechanism that can be in thermal communication with the baking stone insert 144 and/or the accessory heating region 170 positioned above the resistive heating element 132.

Referring again to FIG. 12, it is contemplated that the baking stone insert 144 can include a liquid catch trough 350 that extends around the perimeter of the baking stone insert 144 for catching various materials that may fall away from the food item 276 being cooled on the top planar surface 342 of the baking stone insert 144. The liquid catch trough 350 can also include a sloped configuration that extends downward toward one or more drain apertures 352 that can allow drippings 274 and other food matter that may fall away from the planar surface 342 of the baking stone insert 144 to fall through the drain aperture 352 and into the base pan 130 to be collected for later use or disposal. It is contemplated that the base pan 130 and the resistive heating element 132 are substantially similar to those provided for the powered accessory tray 14 having the grilling insert 142, such that the powered accessory tray 14 can receive, interchangeably, the grilling insert 142 and the baking stone insert 144 for alternative use, depending upon the needs of the user in operating the cooking appliance 10. As with the grilling insert 142, the baking stone insert 144 can include a connector receptacle that can receive a portion of the connecting plug 32 for locating the connecting plug 32 relative to the base pan 130 and/or the oven cavity connector 12 disposed within the heating cavity 20 of the cooking appliance 10.

Referring again to FIGS. 10-12, it is contemplated that the grilling insert 142 and/or the baking stone insert 144 can include an indicator, such as a temperature sensing device 290 or other indicator that can be in thermal communication with the accessory heating region 170 for letting the user know when the accessory heating region 170 is heated to a pre-heated or set temperature. This can be done through the temperature sensing device 290 described above or through a visual indicator on the grilling and/or baking stone inserts 142, 144, such as a temperature sensitive material that can change color based upon the surface temperature of the grilling and/or baking stone inserts 142, 144.

According to the various embodiments, it is contemplated that the resistive heating element 132 of the powered accessory tray 14 can be used in conjunction with the heat source 22 for the cooking appliance 10 to provide more efficient preheating and cooking functions for the powered accessory tray 14 and the heating cavity 20 of the cooking appliance 10. In this manner, depending upon the powered accessory tray 14 being implemented, electrical power can be split between the resistive heating element 132 of the powered accessory tray 14 and the heat source 22 of the cooking appliance 10, to direct and apportion heating to specific portions of the primary heating region 172 of the heating cavity 20 and the accessory heating region 170 proximate the powered accessory tray 14. This cooperation can be set by the indicative data 212 provided to the control unit 240 when the identifier portion 210 of the connecting plug 32 engages the accessory protection mechanism of the oven cavity connector 12. This data can also be provided through the positioning of the powered accessory tray 14 within the oven cavity both vertically and laterally within the heating cavity 20 for providing a predetermined level of heating through the use of the resistive heating element 132 of the powered accessory tray 14 and/or the heat source 22 of the cooking appliance 10.

Figure 13:
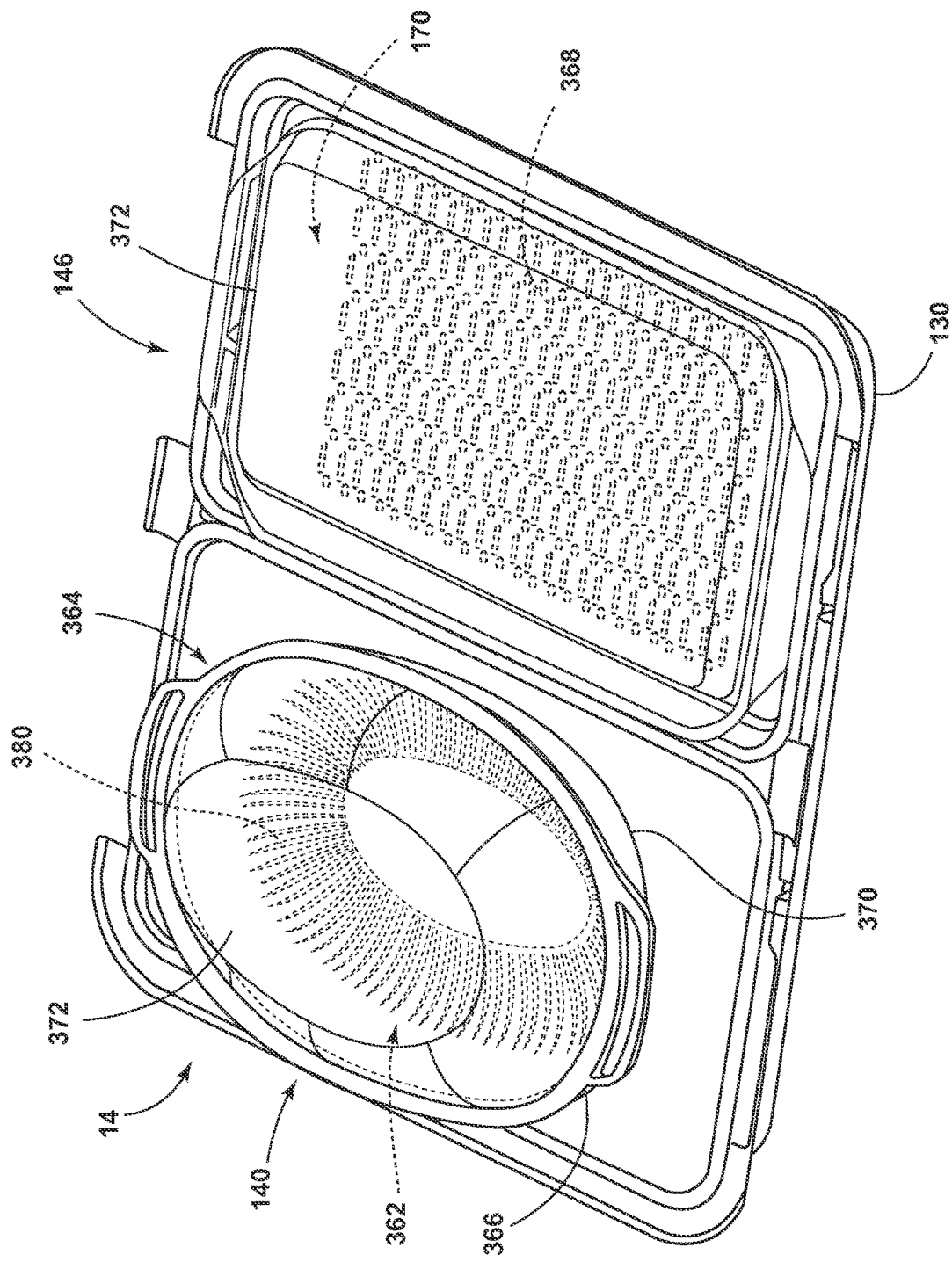
FIG. 13 is a top perspective view of a powered accessory tray having an aspect of a steaming insert.
Figure 14:
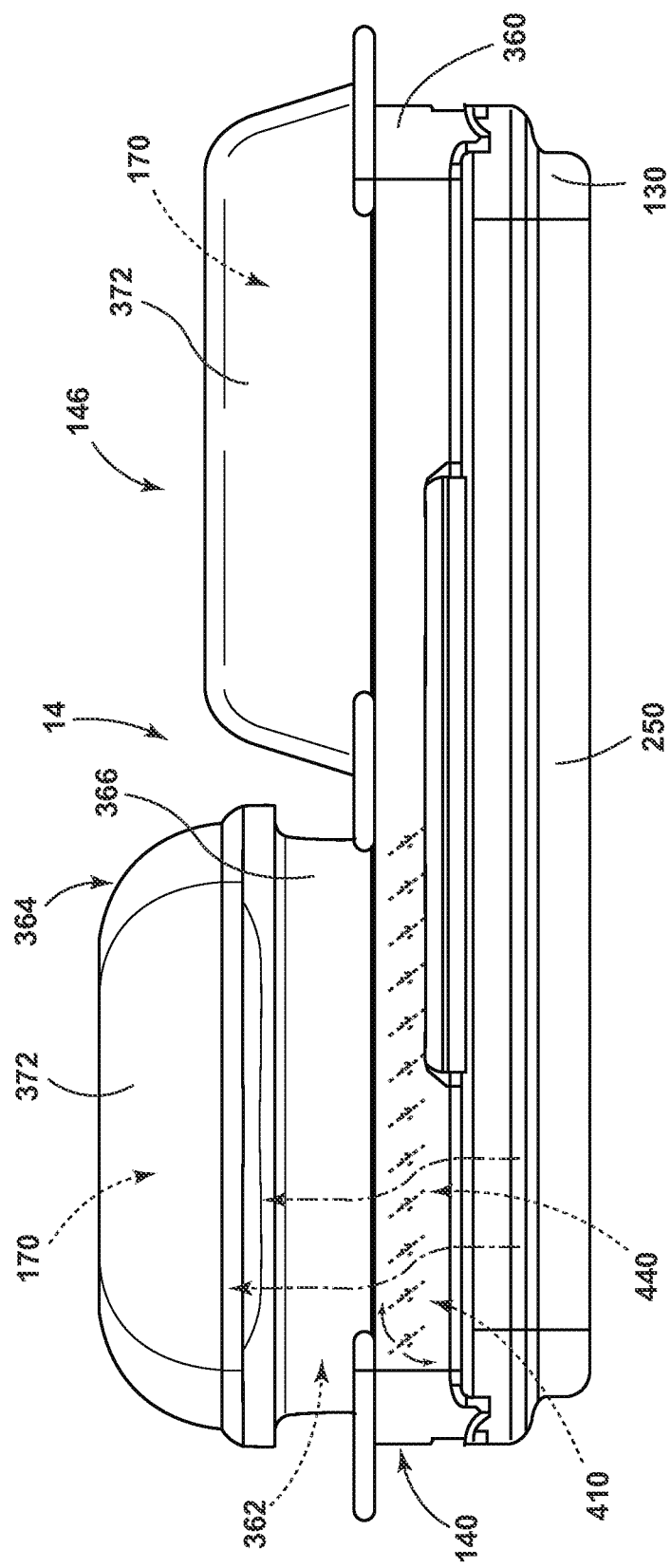
FIG. 14 is a side elevational view of an aspect of the powered accessory tray of FIG. 13.
Figure 15:
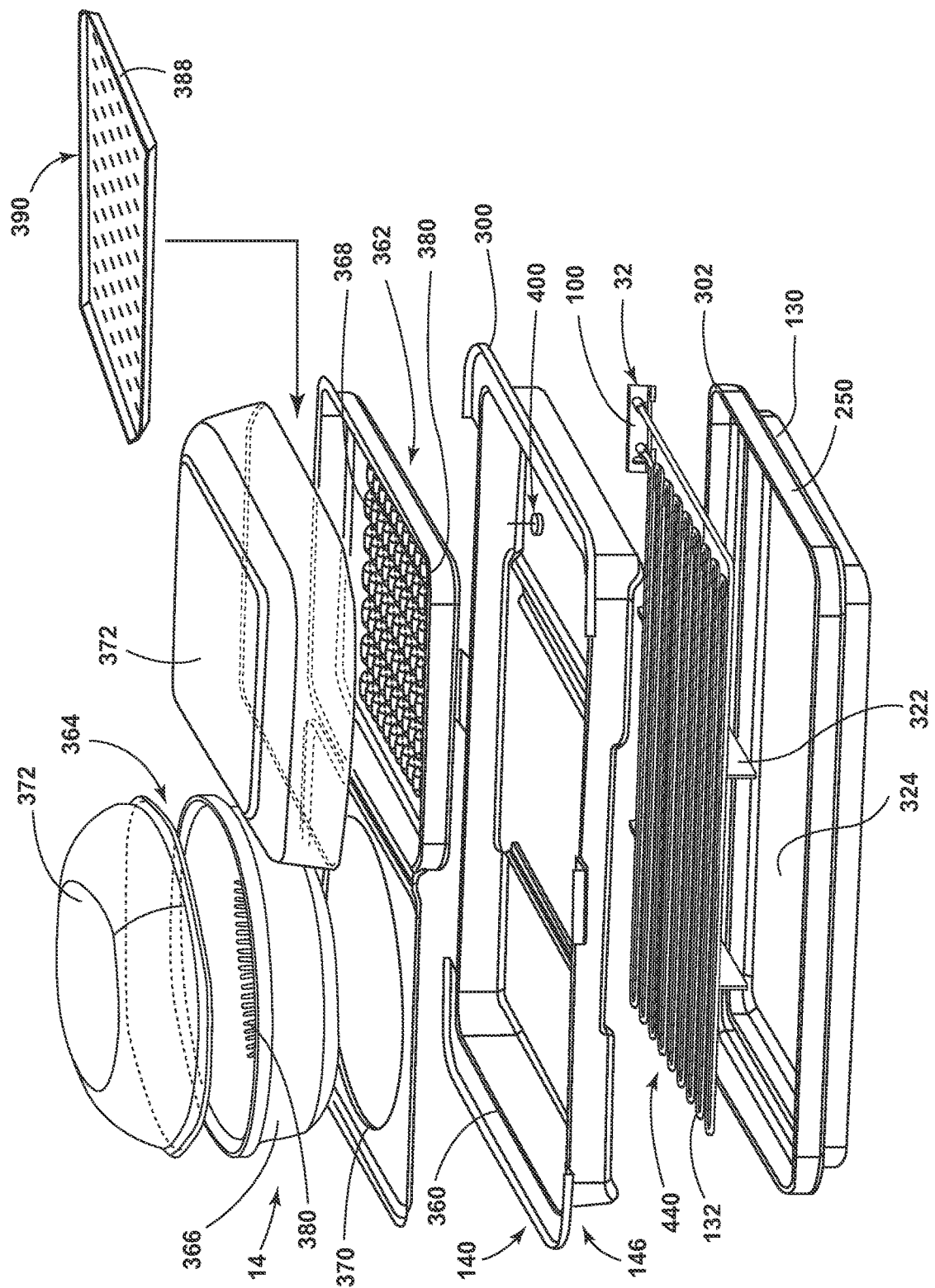
FIG. 15 is an exploded perspective view of an aspect of the powered accessory tray of FIG. 13.
Figure 16:
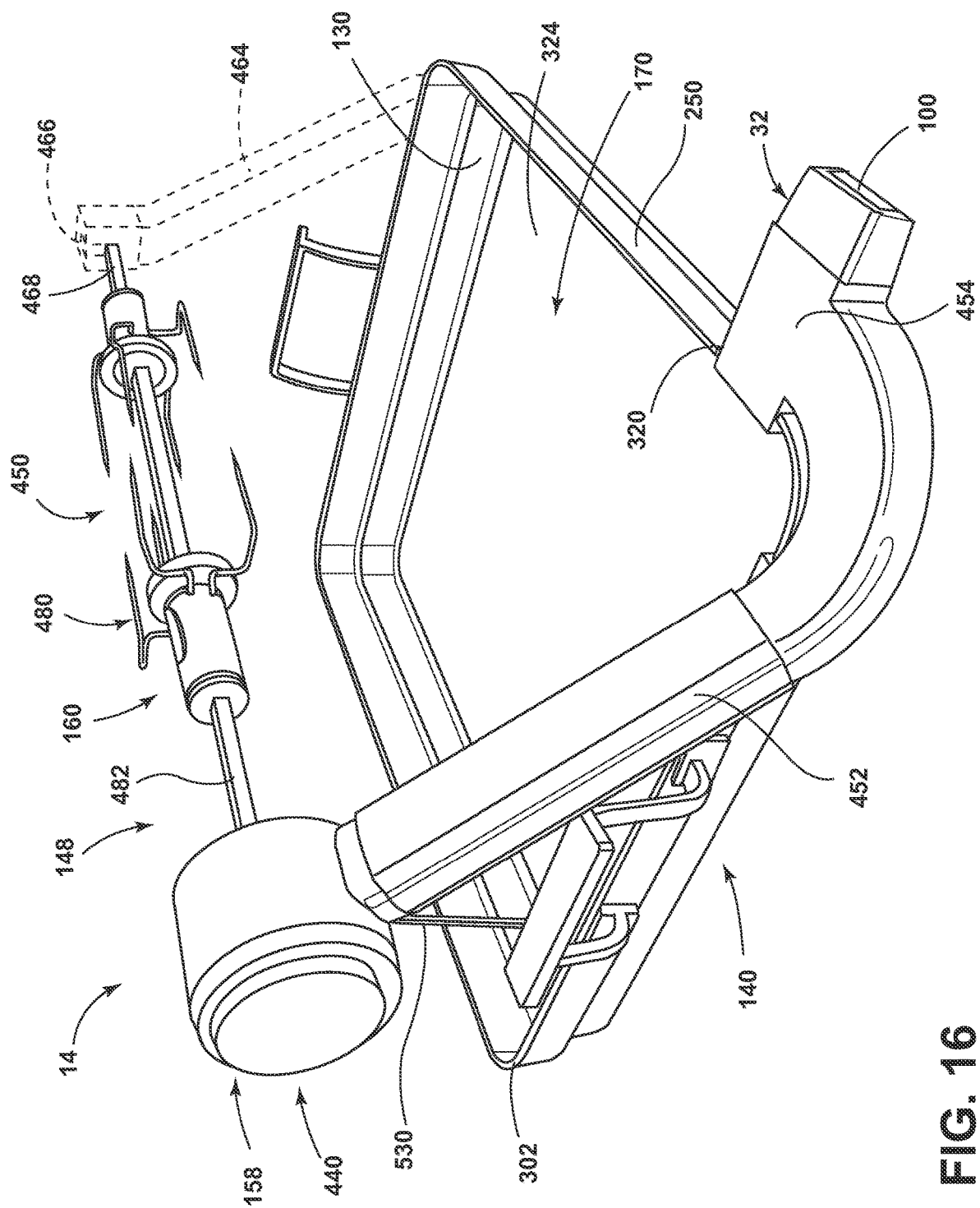
FIG. 16 is a powered accessory tray having a rotisserie insert for use in conjunction with an aspect of the oven cavity connector.
Figure 17:
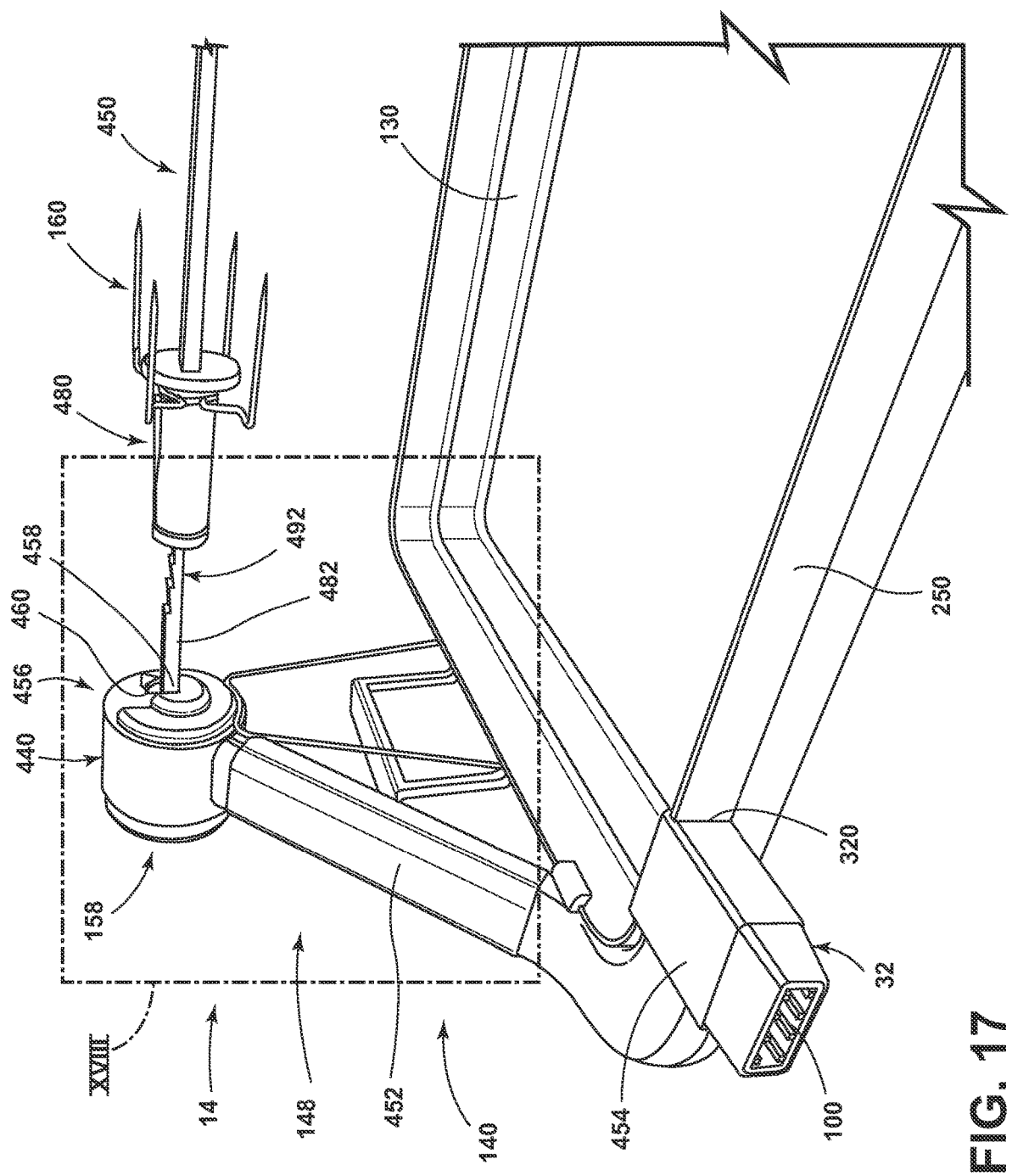
FIG. 17 is a rear perspective view of the powered accessory tray of FIG. 16.
Figure 18:
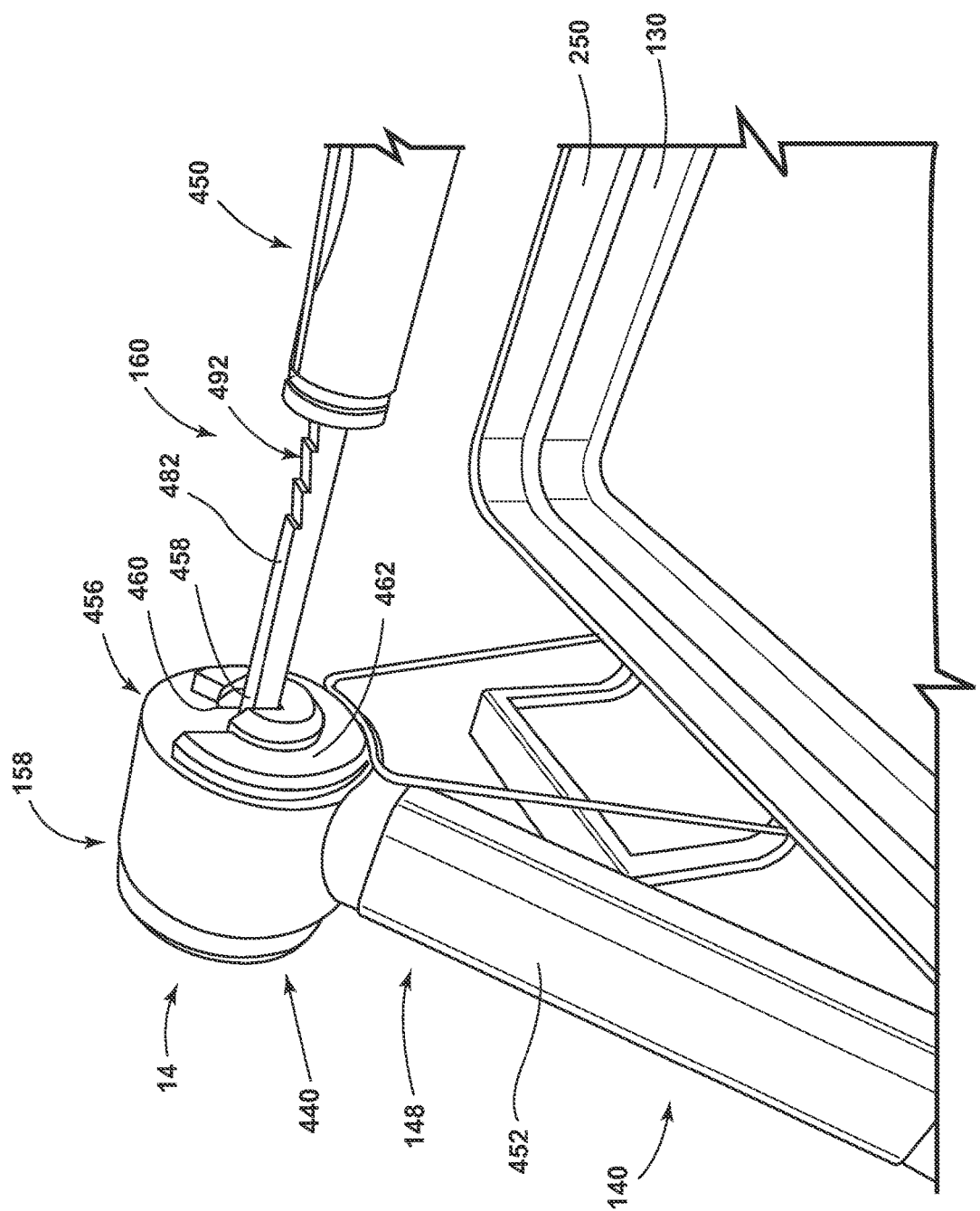
FIG. 18 is an enlarged perspective view of the powered accessory tray of FIG. 17 taken at area XVIII.
Figure 19:
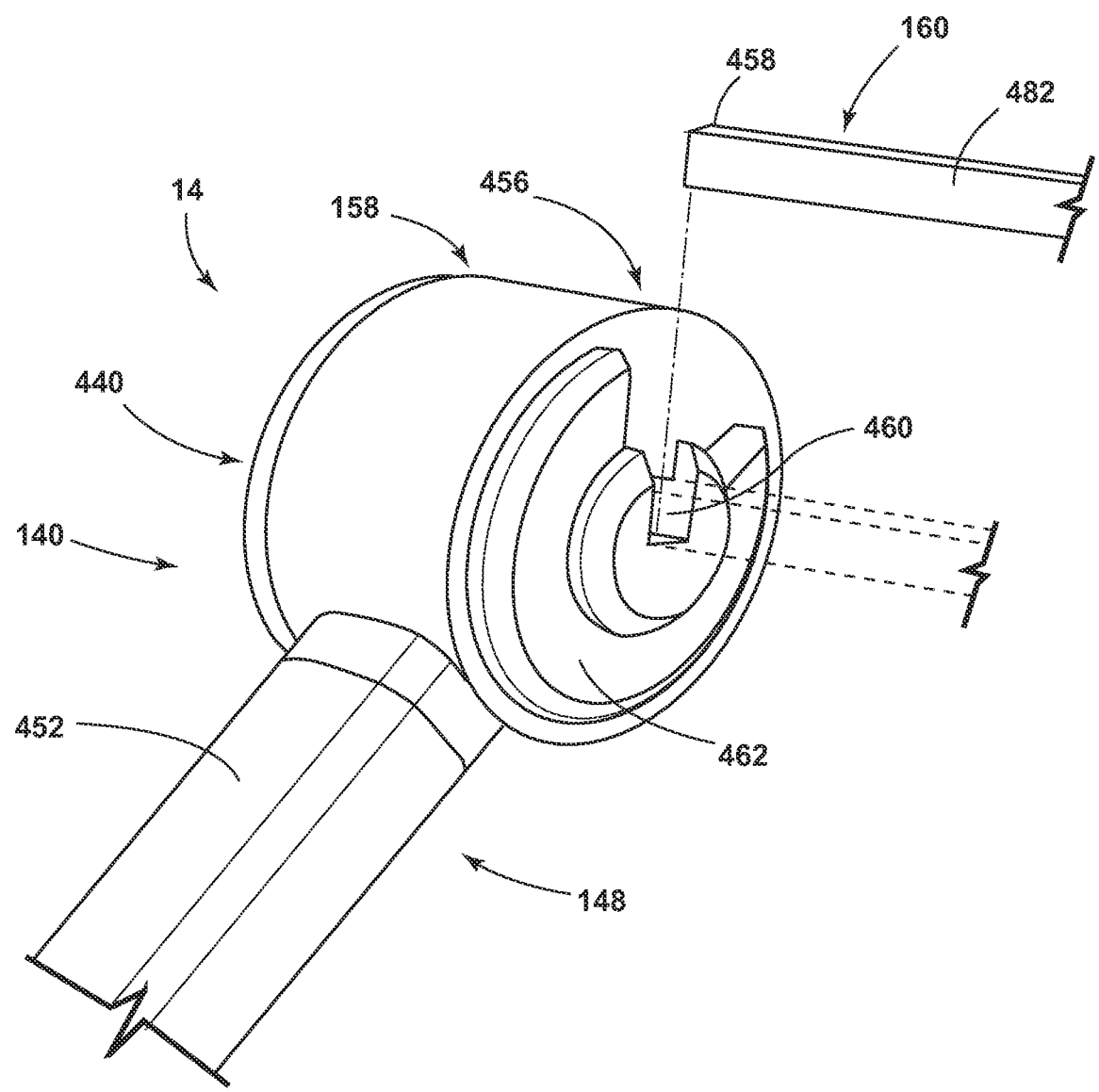
FIG. 19 is an enlarged perspective view of an aspect of the rotisserie insert of FIG. 18 showing the spit in a disengaged position.
Figure 20:
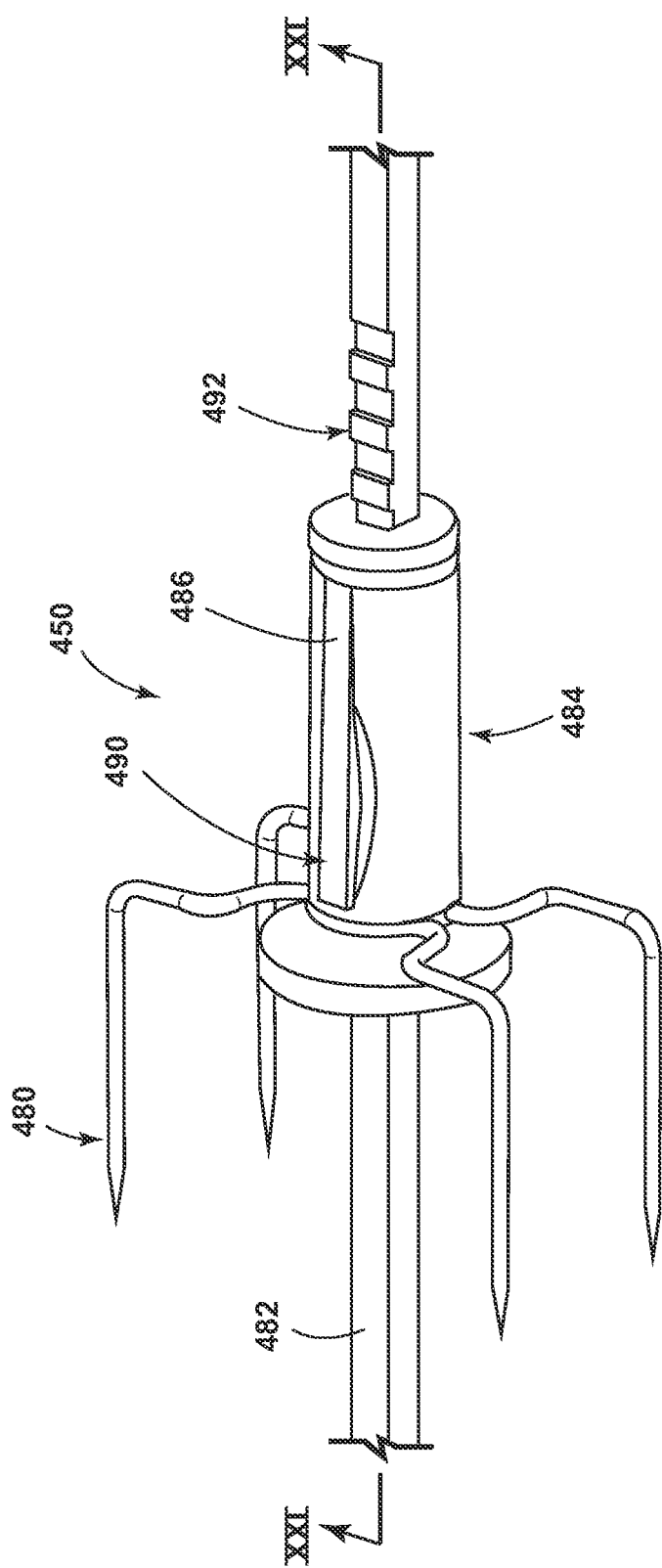
FIG. 20 is a side perspective view of the spit for the rotisserie insert of FIG. 16.
Figure 21:
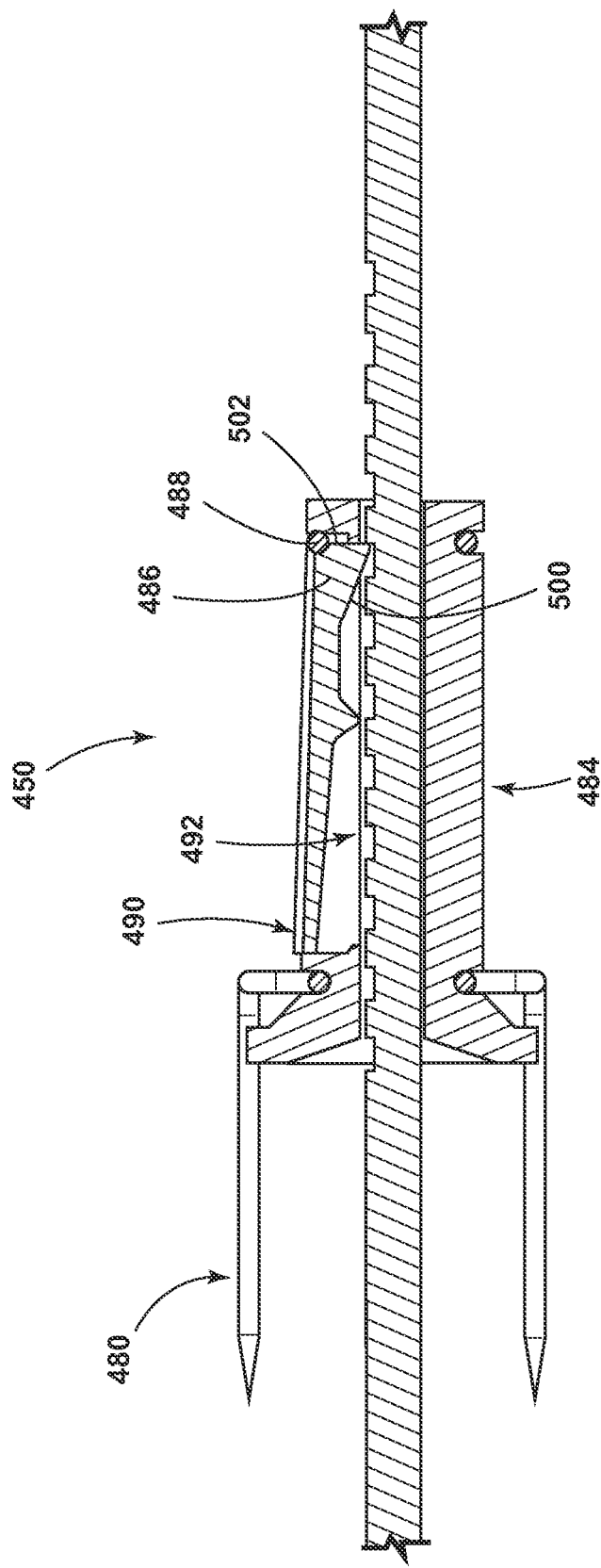
FIG. 21 is a cross-sectional view of the spit of FIG. 20 taken along line XXI-XXI.
Figure 22:
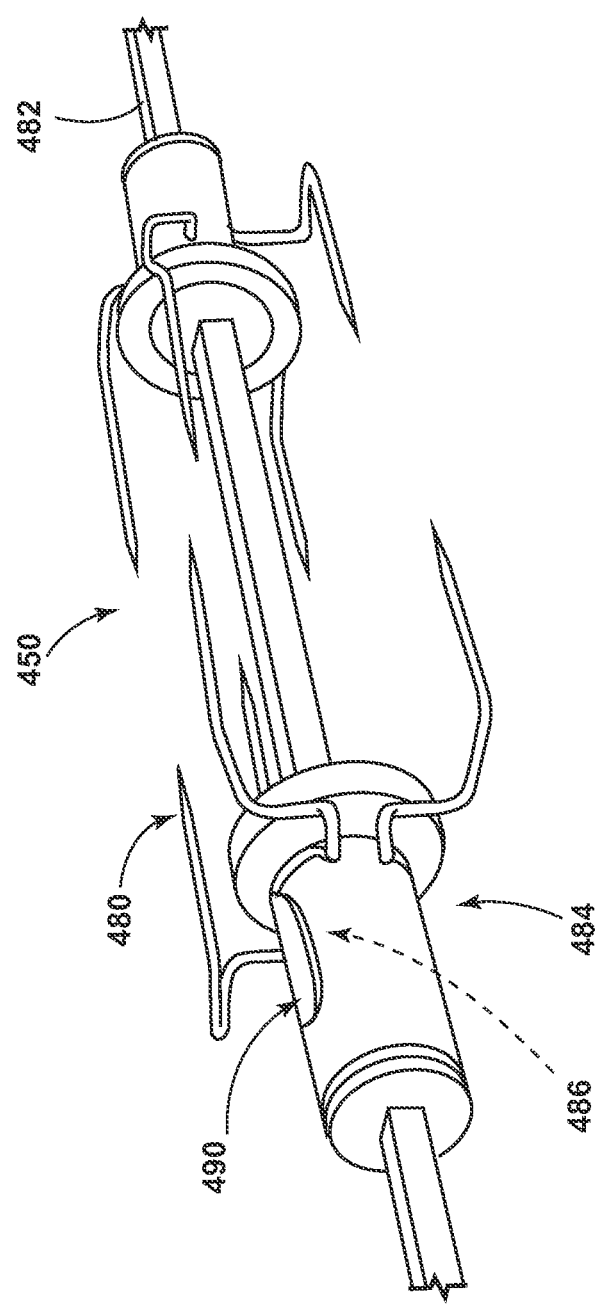
FIG. 22 is an alternate aspect of the spit for the rotisserie insert for a powered accessory tray.

Referring now to aspects of the device as exemplified in FIGS. 13-15, a steaming insert 146 for the powered accessory tray 14 having the base pan 130 and the resistive heating element 132 can include a fluid pan 360 for selectively holding fluid within the heating cavity 20. In such an embodiment, the fluid pan 360 is positioned within the accessory heating region 170 such that the accessory heating region 170 defines at least one steaming zone 362 positioned above the resistive heating element 132 and also above the fluid pan 360 for the steaming insert 146. The steaming insert 146 can also include one or more steaming compartments 364 that are disposed within the accessory cooking region. During operation, the resistive heating element 132 is activated and heats the fluid disposed within the fluid pan 360 to generate steam that emanates upward and through the various steaming compartments 364 of the steaming insert 146.

According to the various embodiments, the steaming insert 146 can include a single steaming compartment 364 or can include a plurality of steaming compartments 364. Such steaming compartments 364 can include a removable container 366 that can be selectively disposed within and removed from the steaming insert 146 for the positioning of various food items 276 such that while the steaming insert 146 can be maintained within the heating cavity 20, the removable container 366 can be placed within and removed from the steaming insert 146 as necessary. It is also contemplated that the steaming insert 146 can include a steaming tray 368 upon which various food items 276 can be placed and through which steam can emanate for heating various food items 276 within the steaming insert 146. The steaming tray 368 can also include container apertures 370 for receiving the various removable containers 366 that can be removed from and disposed within the steaming insert 146. Various steaming lids 372 can be disposed upon the removable container 366 or steaming tray 368, or both, to contain or substantially contain steam within the steaming insert 146.

It is contemplated that steam that does escape from the steaming insert 146 can be recirculated for reuse in the steaming insert 146, for use in other portions of the heating cavity 20, recirculated by a ventilation system 340, for use in other portions of the cooking appliance 10 or other portions of the areas surrounding the cooking appliance 10. Alternatively, the steam emanating from the steaming insert 146 can be evacuated from the cooking appliance 10 by the ventilation system 340 and moved through various steam conduits for disposal outside of at least the immediate area of the cooking appliance 10. The ventilation system 340 can be incorporated as part of the cooking appliance 10, as part of the powered accessory tray 14, or both.

Referring again to FIGS. 13-15, the steaming insert 146 can include various steam apertures 380 that allow steam to emanate from the fluid pan 360, and through the accessory heating portion such that the steam can be filtered through the food items 276 for providing a cooking and steaming functionality for food items 276 placed within the steaming insert 146 during use.

It is contemplated, in various embodiments, that the fluid pan 360 can also be used to store various flavoring materials to provide a flavor infusing and/or smoking functionality within the steaming insert 146 as a smoker attachment 388 of the steaming insert 146, or a separate smoker insert 390. In such an embodiment, it is contemplated that wood chips and other flavor-producing materials commonly used in smoking functions can be disposed within the fluid pan 360 or tray or above the fluid pan 360 or tray or in a separate smoker attachment or insert 388, 390, such that flavor from the wood chips or other flavoring material can be infused into the food item 276 being cooked within the heating cavity 20.

Referring again to FIGS. 13-15, it is contemplated that the fluid pan 360 can include a boil dry indicator 400 disposed within the fluid pan 360 that provides an indication to the user that the fluid pan 360 has boiled away all of the fluid such that no additional steaming operations are being performed during use of the steaming insert 146. The boil dry indicator 400 can be in the form of a float within the fluid pan 360, fluid sensor, visual sensor, humidity sensor, temperature sensor, combinations thereof, or other mechanism that can detect the level of fluid in the fluid pan 360 and/or the absence or presence of fluid in the fluid pan 360. The boil dry indicator 400 provides the user with an alert so that the user knows when the fluid pan 360 needs to be refilled with fluid, such as water or other steam-producing material. According to various alternate embodiments, it is contemplated that the fluid pan 360 can be coupled with a fluid-dispensing port placed in communication with a heating cavity 20 such that the fluid-dispensing port can maintain a certain amount of fluid within the fluid pan 360. In such an embodiment, the fluid-providing port can be configured to add small amounts of water so as to not produce a significant cooling effect within the fluid pan 360 that might slow or otherwise interrupt the steaming operation of the steaming insert 146. Accordingly, small trickles or drops of water can be added to the fluid pan 360 to maintain the fluid level but also maintain the temperature of the accessory heating region 170 for allowing continuous use of the steaming functions of the steaming insert 146.

According to the various embodiments, as exemplified in FIGS. 13-15, the steaming insert 146 and/or a smoker insert 390 can be configured to include a steam/smoke regulating mechanism 410 that can be operated to monitor and control the amount of steam and/or smoke that is delivered into the accessory heating region 170. Such a regulating mechanism 410 can take the form of baffles, operable apertures, blowers, suction mechanisms, combinations thereof, or other similar steam/smoke regulating mechanisms 410. The regulating mechanism 410 can be manually operated or can be automated and controlled by the motor assembly 158 of the powered accessory tray 14 and the user interface 242 for the cooking appliance 10 through the engagement of the powered accessory tray 14 with the oven cavity connector 12. In this manner, the amount and intensity of the steam and/or smoke can be controlled. As such, the intensity of flavors and/or steam that are infused into the food items 276 being cooked can be adjusted according to preset operational parameters 214 or according to the preferences of the user.

According to various embodiments, the cooking appliance 10 and/or the powered accessory tray 14 having a steaming insert 146 or smoker insert 390 can include steam/smoke capturing mechanism 420 that includes a blower or suction device. Such capturing mechanism 420 can be activated when the appliance door 190 of the cooking appliance 10 is opened to prevent or substantially prevent steam and/or smoke emanating from the heating cavity 20 and possibly tripping a household smoke/fire alarm. The capturing mechanism 420 can be configured to recirculate the steam/smoke for later use, or can evacuate the steam/smoke to an area outside the household or the atmosphere. The capturing mechanism 420 an also utilize the ventilation system 340 of the cooking appliance 10, the powered accessory tray 14, or both.

It is contemplated that when the steaming insert 146 is used within the heating cavity 20, the indicative data 212 provided to the control unit 240 when the powered accessory tray 14 having the steaming insert 146 is engaged with the oven cavity connector 12, certain functions of the cooking appliance 10 can be locked out that may either interfere with the steaming functions of the steaming insert 146 or that may be interfered with by the use of the steaming insert 146. Alternatively, it is contemplated that the thermal partitions 180 can be installed within the heating cavity 20, such that the steaming function can be used in conjunction with other cooking functions of the cooking appliance 10 that may not be cooperative with steaming functions. Such thermal partition or partitions 180 can include a moisture barrier that prevents transfer of steam from the use of the powered accessory tray 14 to other portions of the heating cavity 20 that may interfere with alternate cooking functions within the heating cavity 20. The thermal partitions 180 can also prevent substantially dry air or dry air from other portions of the heating cavity 20 from infiltrating the accessory heating region 170 proximate the powered accessory tray 14 during use of the steaming insert 146.

According to the various embodiments, it is contemplated that the resistive heating element 132 for the powered accessory tray 14 can include multiple heating elements that can be used to produce varying levels of heating within the accessory heating region 170 immediately above the resistive heating element 132. By way of example, and not limitation, one side of the resistive heating element 132 may be dedicated for use in conjunction with a smaller grill insert or baking stone insert 144. A separate portion of the resistive heating element 132 or a separate resistive heating element 132 altogether can be used in conjunction with a smaller steaming insert 146 for simultaneous use of steaming and baking or grilling functions within a single powered accessory tray 14. According to various embodiments, it is contemplated that the resistive heating element 132 can be used to create multiple heating zones such as a left, center and right heating zone, or can be split into four or more quadrants for producing smaller, dedicated heating zones within the accessory heating region 170. Thermal partitions 180 can be placed upon the various inserts for providing additional thermal division between the various sub-heating areas of the accessory heating region 170.

According to the various embodiments, it is contemplated that the steaming insert 146 can include a steam assist mechanism that utilizes steam from the fluid pan 360 but also utilizes steam produced by the cooking appliance 10. It is also contemplated that the fluid pan 360 can be heated by the resistive heating element 132 and also heated by the heat source 22 for the cooking appliance 10 to provide a superheated steam that can be delivered through the accessory heating region 170 proximate the powered accessory tray 14.

Referring again to FIGS. 10-26, a system of powered accessory trays 14 for use in a cooking appliance 10 can include one or more powered accessory trays 14. Each powered accessory tray 14 can include a base pan 130 or tray that alternatively and selectively engages one of the tray sliding structures 34 of the heating cavity 20 of the cooking appliance 10. As discussed above, the heating cavity 20 can include a plurality of tray sliding structures 34 defined within the interior surface 24 of the heating cavity 20. A powered portion 440 of the powered accessory tray 14 can be supported by the base pan 130, wherein the powered portion 440 receives electrical power from the cooking appliance 10. A connecting plug 32 is placed in communication with the cooking appliance 10 and the powered portion 440 of the powered accessory tray 14. The selective engagement of the connecting plug 32 with an oven cavity connector 12 disposed within the heating cavity 20 of the cooking appliance 10 places the powered portion 440 in communication with the cooking appliance 10. As discussed above, the powered portion 440 of the powered accessory tray 14 can include, but is not limited to, a resistive heating element 132, a motor assembly 158, a rotisserie motor, a stirring mechanism, an air circulating convection mechanism, a pressure cooking mechanism, combinations thereof, and other powered components that can be used in conjunction with the powered accessory trays 14 for the cooking appliance 10.

Referring again to FIGS. 2-26, the powered accessory tray 14 used in conjunction with the oven cavity connector 12 can include an accessory detection mechanism 104 that is disposed within the oven cavity connector 12. The accessory detection mechanism 104 can selectively engage an identifier portion 210 disposed on a connecting plug 32 of each of the powered accessory trays 14. It is contemplated that the identifier portion 210 of each of the connecting plugs 32 for each of the powered accessory trays 14 can provide a unique identifier, such as the indicative data 212, that can distinguish one powered accessory tray 14 from another. Engagement of the connecting plug 32 of any one of the powered accessory trays 14 with the oven cavity connector 12 serves to place the accessory detection mechanism 104 in communication with the identifier portion 210 to transfer indicative data 212 of the corresponding powered accessory tray 14 from the identifier portion 210 to the accessory detection mechanism 104. The indicative data 212 of the corresponding powered accessory tray 14 sets predetermined operational parameters 214 of the cooking appliance 10. As discussed above, the operational parameters 214 can be stored within a control unit 240 of the cooking appliance 10, or operational instructions 230 and/or operational parameters 214 can be stored within each of the powered accessory trays 14 such that data can be delivered from the powered accessory tray 14 to the cooking appliance 10, as each powered accessory tray 14 is engaged with the one or more connecting ports 70 of the oven cavity connector 12. It is also contemplated that the operational parameters 214 and/or operational instructions 230 can be downloaded via internet data retrieval. Such internet data retrieval can be through a Wi-Fi, cellular, or other similar wireless connection to a remote server or cloud computing mechanism.

Referring again to FIGS. 16-26, at least one of the powered accessory trays 14 can include the motor assembly 158. When the base pan 130 is in selective communication with one of the tray sliding structures 34, the motor assembly 158 is selectively placed in communication with the oven cavity connector 12. When so engaged, the motor assembly 158 can be placed in rotational communication with various rotational mechanisms, including, but not limited to, a stirring mechanism, rollers, a rotisserie tool 450, combinations thereof and other similar rotational mechanisms. The rotisserie tool 450 can include a motor arm 452 that extends upward from a plug housing 454. In this manner, electrical power can be delivered from the connecting plug 32 to the motor assembly 158 through the motor arm 452. The motor assembly 158 is typically disposed at the end of the motor arm 452 and includes a rotisserie receptacle 456 that receives a first end 458 of the rotisserie tool 450. The first end 458 of the rotisserie tool 450 is slidably engaged with a rotisserie tool notch 460 that slidably receives a first end 458 of the rotisserie tool 450 to position the first end 458 of the rotisserie tool 450 within a rotational portion 462 of the motor assembly 158. The rotisserie tool notch 460 is vertically oriented such that the first end 458 of the rotisserie tool 450 can be held in place through the force of gravity. Typically, the weight of the rotisserie tool 450 and the food item 276 being cooked substantially prevents the first end 458 of the rotisserie tool 450 from becoming dislodged from the rotisserie tool notch 460 and the motor assembly 158. According to various embodiments, it is contemplated that the rotisserie tool notch 460 can include a closing mechanism that encloses the rotisserie tool notch 460 and secures the first end 458 of the rotisserie tool 450 within the rotisserie tool notch 460 to prevent the first end 458 from inadvertently becoming dislodged from the motor assembly 158. It is contemplated that the base pan 130 can include an idler arm 464 that includes a secondary notch 466 that receives the second end 468 of the rotisserie tool 450 and substantially secures the second end 468 of the rotisserie tool 450 in a similar fashion to that of the first end 458 of the rotisserie tool 450 within the rotisserie tool notch 460 of the motor assembly 158.

Referring again to FIGS. 16-26, the rotisserie insert 148 can include various rotisserie tools 450 that can include, but are not limited to, a spit 160, a rotisserie cage 162, securing tines, a clamshell cage, combinations thereof, and other similar rotisserie tools 450.

Referring now to FIGS. 16-19, where the rotisserie tool 450 includes a spit 160, the first and second ends of the spit 160 are generally engageable with the motor arm 452 and the idler arm 464 at the rotisserie tool notch 460 of the motor assembly 158 and the secondary notch 466 of the idler arm 464. It is contemplated that the first and second ends of the spit 160 are interchangeable such that the first end 458 can be secured within the idler arm 464 and the second end of the spit 160 can be secured to the motor assembly 158. The spit 160 can include operable tines 480 that are slidably operable along the linear member 482 of the spit 160 where the operable tines 480 are configured to engage and, typically, be inserted into a food item 276 to be cooked within the powered accessory tray 14 having the rotisserie insert 148. The operable tines 480 can be connected to a handle assembly 484 having a securing mechanism 486 that can be engaged and disengaged to allow the operable tines 480 to be slidably operated along the linear member 482 of the spit 160. The securing mechanism 486 of the operable tines 480 can be biased in a downward direction through a spring mechanism 488 or other biasing member. In such an embodiment, the handle portion of the operable tines 480 can include a release 490 that allows the user to operate the release 490 for operating the securing mechanism 486 to disengage the handle assembly 484 from securing grooves 492 disposed within the linear member 482 of the spit 160. Accordingly, the user can grasp the handle assembly 484 of the operable tines 480 to disengage the securing mechanism 486 from the securing grooves 492 and slide the tines into position to secure the food item 276 to be cooked onto the spit 160 for cooking within the rotisserie insert 148.

Referring again to FIGS. 16-22, during use of the spit 160, the linear member 482 of the spit 160 can be inserted through the food item 276 to be cooked, such as through the interior cavity of a lamb, pig, chicken, turkey, or other game-type food item 276 or through a more solid food item 276 such as a cut of meat, vegetables, fruits, combinations thereof and other such food items 276. Once the linear member 482 of the spit 160 is inserted, the operable tines 480 can be disposed over the first and second ends 458, 468 of the linear member 482 of the spit 160 and moved into position. In order to move the operable tines 480 into position, the user can slide the operable tines 480 into position without operating the release 490. In such an embodiment, the securing mechanism 486 can include a sloped engaging side 500 that slidably engages the securing grooves 492 defined along the length of the spit 160 so that the operable tines 480 can simply be slid into a particular position.

Once in position, and the food item 276 secured on the linear member 482 of the spit 160, the spit 160 can be placed into the rotisserie tool notch 460 and secondary notch 466 of the motor assembly 158 and idler arm 464 to secure the spit 160 over the base pan 130 for cooking the food item 276 within the rotisserie insert 148. Once the rotisserie insert 148 for the powered accessory tray 14 is engaged with the oven cavity connector 12, the motor assembly 158 is placed in communication with an electrical system of the cooking appliance 10 and the motor assembly 158 operates to rotate the spit 160 and the food item 276 to be cooked over the base pan 130, such that the food item 276 can be evenly cooked during operation of the cooking appliance 10 and the powered accessory tray 14. It is contemplated that food items 276 (exemplified in FIG. 26) other than bird- or game-type food items 276 can also be cooked on the spit 160. Such food items 276 can include, but are not limited to, roasts, small game, various cuts of meat, seafood, vegetables, fruits, combinations thereof, and other similar food items 276.

According to the various embodiments, it is contemplated that the motor assembly 158 of the rotisserie insert 148 can be inserted into the heating cavity 20 of the cooking appliance 10 during operation of the cooking appliance 10. In this manner, the cooking appliance 10 does not require an integral motor and can simply operate through the motor assembly 158 of the rotisserie insert 148. It is also contemplated that the rotisserie insert 148 can be integrated with the base pan 130 of the powered accessory tray 14 such that the motor arm 452, idler arm 464, and connecting plug 32 are directly attached to the base pan 130 to form an integral rotisserie powered accessory tray 14.

Figure 23:
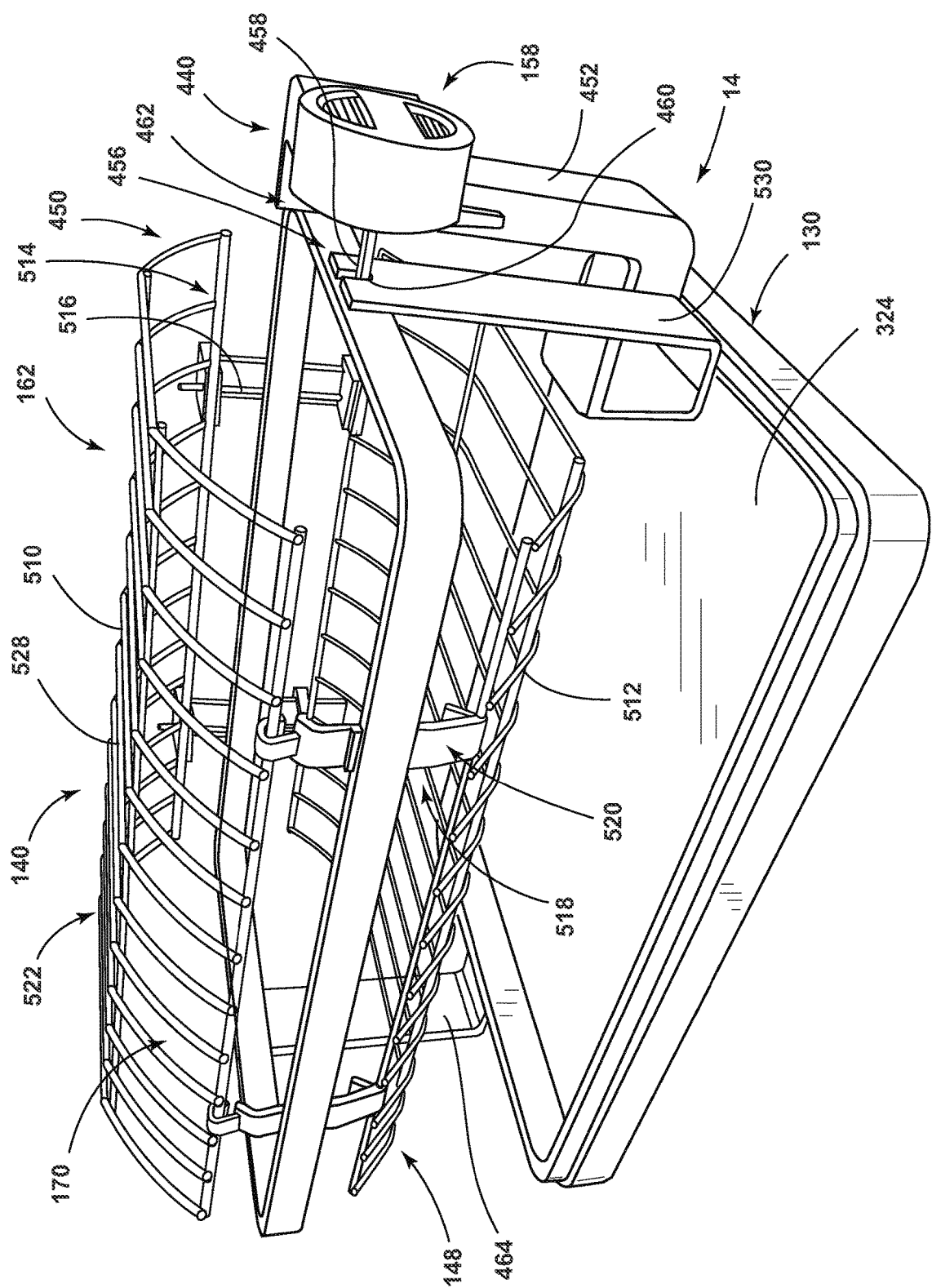
FIG. 23 is a side perspective view of an aspect of the rotisserie insert for a powered accessory tray used in conjunction with the oven cavity connector showing an aspect of the rotisserie cage.
Figure 24:
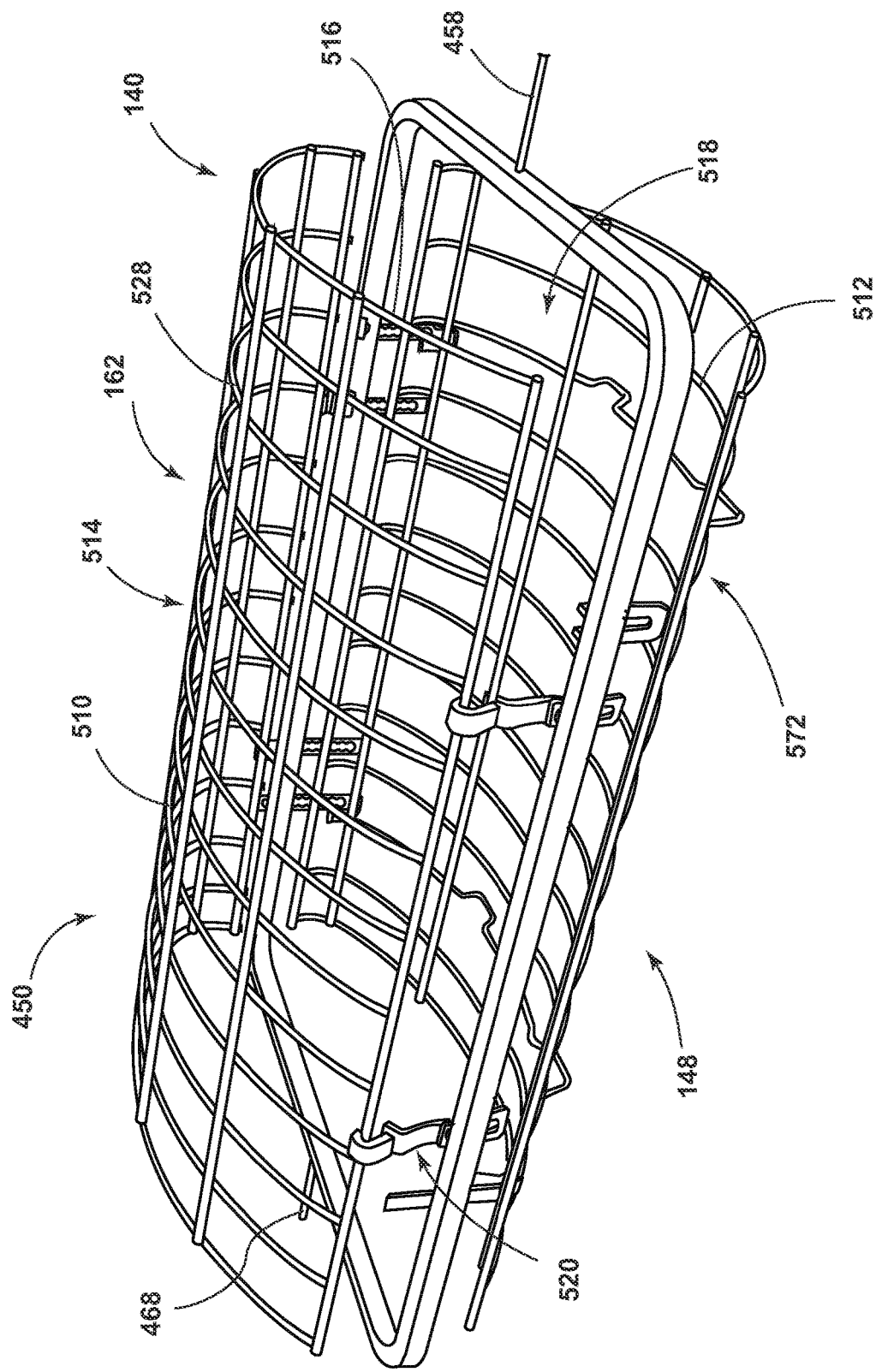
FIG. 24 is another aspect of the rotisserie cage for the powered accessory tray used in conjunction with the oven cavity connector.
Figure 25:
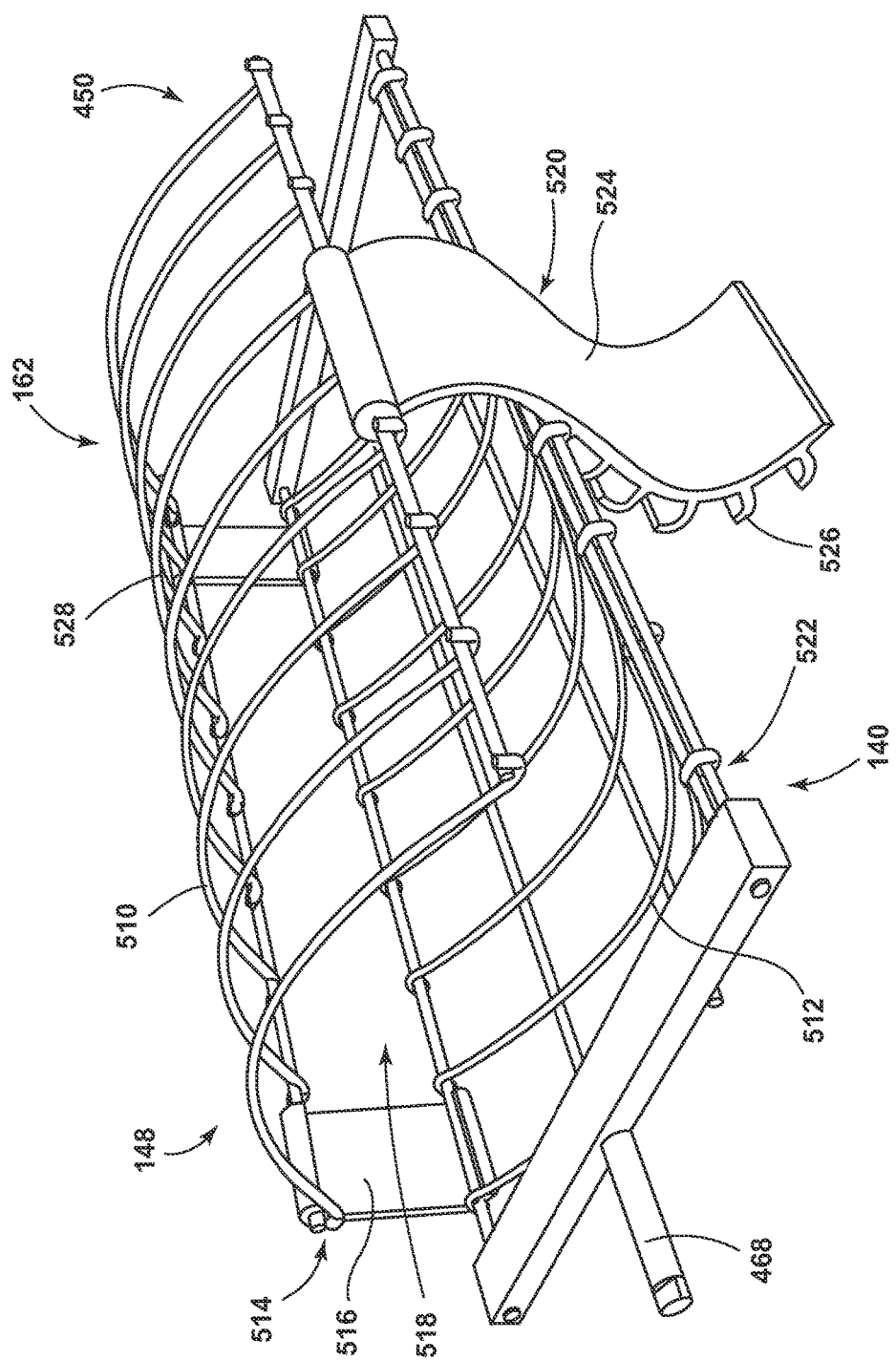
FIG. 25 is another aspect of the rotisserie cage for the powered accessory tray used in conjunction with the oven cavity connector.

Referring now to FIGS. 23-25, the rotisserie insert 148 can include a rotisserie cage 162 having upper and lower cage members 510, 512 that hingedly attach to form a clamshell-type configuration. The upper and lower cage members 510, 512 can be hinged at a rear portion 514 of the rotisserie cage 162 to operate in the clamshell configuration. It is also contemplated that the hinge member 516 of the rotisserie cage 162 can be a vertically operable member, such that the height of the interior cage volume 518 can be modified to account for food items 276 having different sizes and shapes. Accordingly, where a small roast is being cooked, the upper cage member 510 can be lowered relative to the lower cage member 512 to decrease the size of the interior cage volume 518 to contain and secure the food item 276 within the rotisserie cage 162. Similarly, where a larger food product is being cooked within the rotisserie cage 162, the upper cage member 510 can be moved away from the lower cage member 512 to enlarge the size of the interior cage volume 518. Additionally, it is contemplated that the hinge members 516 of the rotisserie cage 162 can be moved independently such that one side of the upper cage member 510 can be moved lower and the other side of the upper cage member 510 can be moved higher to account for various irregularities in the size and shape of the food item 276 being cooked. It is also contemplated that the lower cage member 512 and upper cage member 510 can both be moved relative to one another in order to maintain the food item 276 at a substantially level position within the rotisserie insert 148 and over the base pan 130 to provide substantially even cooking of the food member within the rotisserie cage 162.

Referring again to FIGS. 23-25, the closing mechanism 520 of the rotisserie cage 162 can include various operable hooks, tabs, clasps, hasps, and other closing mechanisms 520 to secure the rotisserie cage 162 in a closed position 522 to maintain the upper and lower cage members 510, 512 in a substantially fixed position as the rotisserie cage 162 is rotated by the motor assembly 158 of the rotisserie insert 148 or the motor assembly 158 of the rotisserie powered accessory tray 14. The closing mechanism 520 for the rotisserie cage 162 can also include a substantially curved member 524 having engaging tabs 526 that protrude therefrom, where the curved member 524 is substantially flexible to allow for movement of the upper and lower cage members 510, 512 to account for irregularities in the food items 276 being placed within the interior cage volume 518 of the rotisserie cage 162. It is contemplated that the various closing mechanisms 520 of the rotisserie cage 162 can account for varying distances between the upper and lower cage members 510, 512 such that the closing mechanism 520 and the rear hinge members 516 can be vertically operated to modify the size of the interior cage volume 518 to account for food items 276 having various shapes and sizes. It is contemplated that the rotisserie cage 162 can also be used for cooking numerous small items such that the upper and lower cage members 510, 512 have a wire grid configuration 528 that accounts for both small food items 276 and larger food items 276 such that the various food items 276 placed within the interior cage volume 518 can be contained and secured within the rotisserie cage 162.

Referring again to FIGS. 16-22, it is contemplated that the linear member 482 of the spit 160 can be placed within the rotisserie tool notch 460 and a secondary notch 466 through the use of various hand-type tools that can be coupled to the first and second ends 458, 468 of the linear member 482 to raise and lower the spit 160 into and away from engagement with the rotisserie tool notch 460 and the secondary notch 466. Such lifting mechanisms can include a tool that at least partially wraps around a portion of the linear member 482 to lift the spit 160 from below. The spit 160 can also include a detachable handle that can be engaged with the first or second ends 458, 468 of the linear member 482 of the spit 160 for manipulating the spit 160 between various positions into and away from engagement with the rotisserie tool notch 460 and the secondary notch 466 of the rotisserie insert 148 and/or the rotisserie powered accessory tray 14.

According to the various embodiments as exemplified in FIGS. 16-25, the various handles and attachment mechanisms of the rotisserie insert 148 and/or the rotisserie powered accessory tray 14 can be made of various thermally insulative materials such as silicone, ceramic, and other similar thermally insulative materials. In such an embodiment, the various closing mechanisms 520 and handles can be grasped by a user after the spit 160 and/or the rotisserie cage 162 have been used within the cooking appliance 10. These thermally insulative materials can be more convenient to grasp with gloves, oven mitts, or, in various embodiments, with a bare hand where the material is particularly thermally insulative, such as in the case of silicone.

According to the various embodiments, the motor arm 452 and the idler arm 464 can be manipulated relative to the base pan 130 to account for various heights of the rotisserie tool notch 460 of the motor assembly 158 and the secondary notch 466 of the idler arm 464. Greater heights may be necessary for the larger rotisserie cage 162 where lower heights of the motor assembly 158 may be desired for the spit 160. It is also contemplated that the rotisserie cage 162 and the spit 160 can be included within separate rotisserie inserts 148 or even separate rotisserie powered-accessory trays that can be used in conjunction with the oven cavity connector 12 and the heating cavity 20 of the cooking appliance 10. Where the motor arm 452 and idler arm 464 are operable, the movement of the motor assembly arm and idler arm 464 are configured such that the rotisserie tool notch 460 of the motor assembly 158 and the secondary notch 466 of the idler arm 464 are maintained in a substantially central position over the base pan 130 such that the rotisserie cage 162 and spit 160 do not substantially extend or do not extend outside of the boundary of the base pan 130 during cooking. In this manner, substantially all of the drippings and other matter that may fall away from a food item 276 being cooked can be captured by the base pan 130 for later use or disposal. It is also contemplated that vertical supports 530 can extend from the motor arm 452 of the motor assembly 158 and the idler arm 464 to portions of the base pan 130. These vertical supports 530 provide supplemental structure for supporting the weight of the rotisserie tool 450 and the food item 276 (exemplified in FIG. 26).

Figure 26:
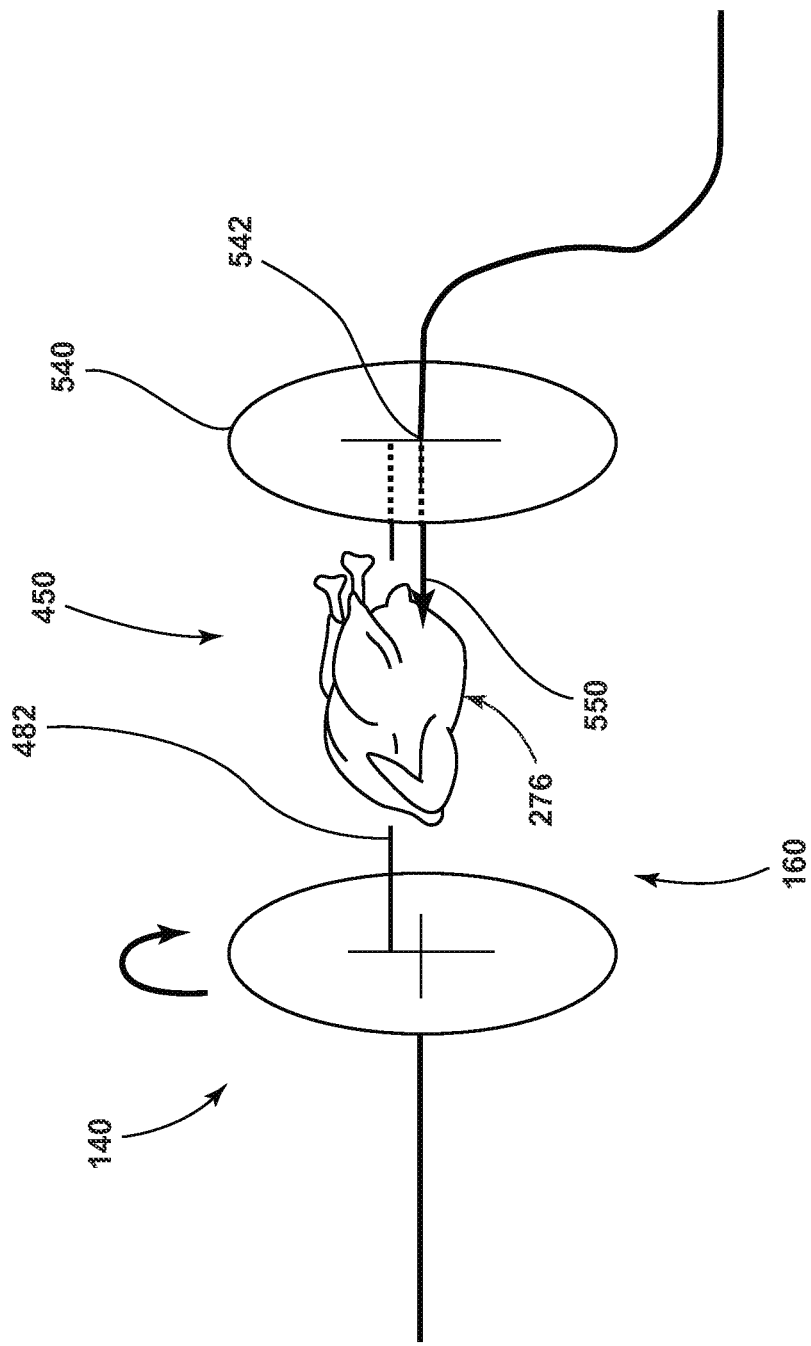
FIG. 26 is a schematic view of an aspect of the spit for the rotisserie insert incorporating an integral temperature sensor.
Figure 27:
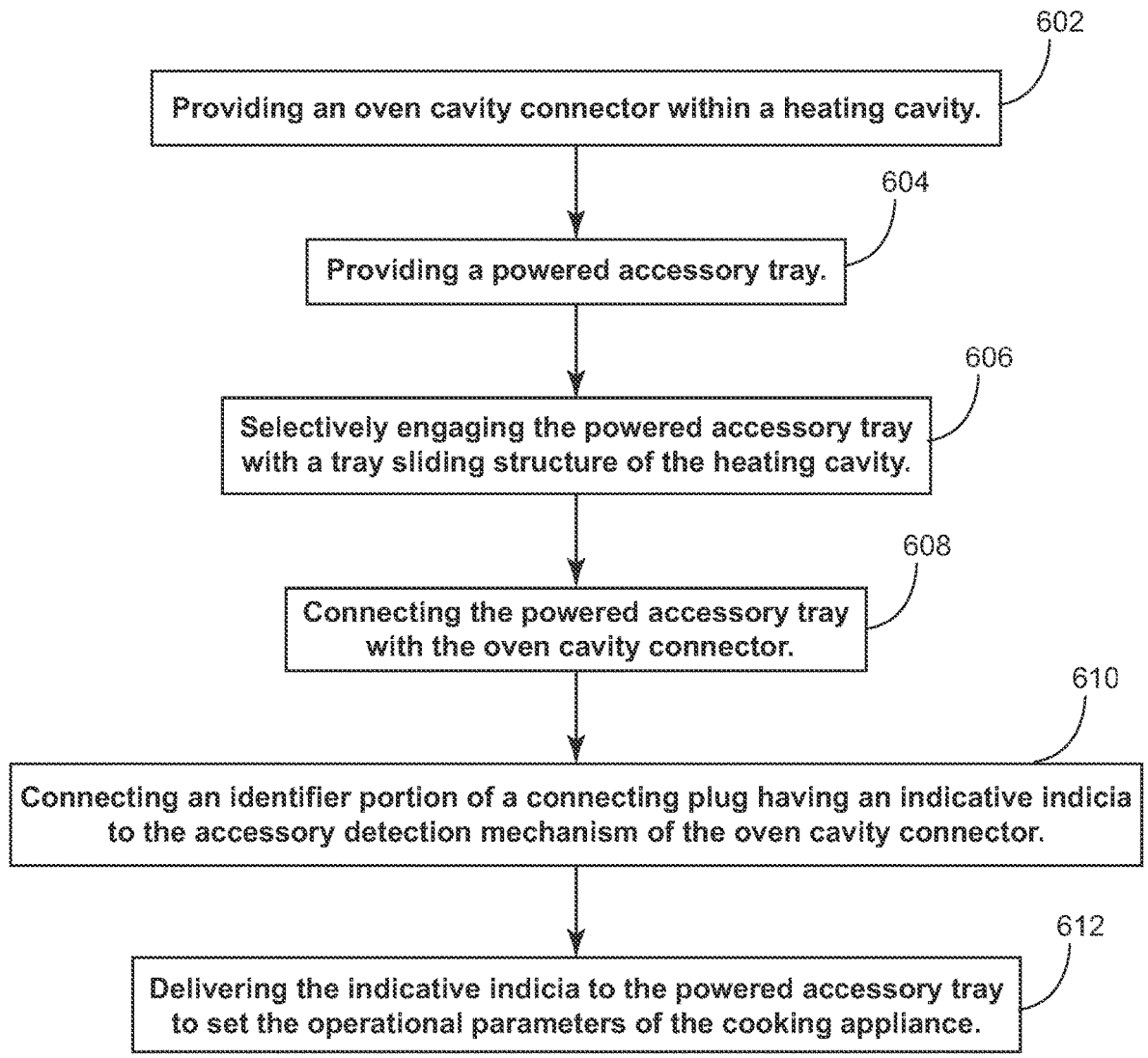
FIG. 27 is a schematic flow diagram illustrating a method for operating a cooking appliance incorporating the oven cavity connector used in conjunction with a plurality of powered accessory trays.

Referring now to FIG. 26, it is contemplated that the rotisserie insert 148 and/or the rotisserie powered accessory tray 14 can include an integrated temperature sensor 550 disposed proximate the spit 160. According to the various embodiments, the spit 160 having an integral temperature sensor 550 can include a disk member 540 connected to at least the first end 458 of the linear member 482 of the spit 160 proximate the motor assembly 158 to provide circular movement of the spit 160 and the temperature sensor 550.

According to the various embodiments, the spit 160 can be mounted away from a center 542 of the disk member 540 and the temperature sensor 550, in the form of a meat probe or other temperature monitoring device can be inserted through the center 542 of the disk member 540 and into the food item 276 disposed on the spit 160. In this manner, the spit 160 is configured to rotate about the center 542 of the disk member 540 such that the spit 160 traces a substantially cylindrical pattern about the center 542 of the disk member 540. The temperature sensor 550, being mounted in the center 542 of the rotating disk member 540, maintains a substantially non-eccentric and consistent position relative to the disk member 540 and also within a central portion of the food item 276 being cooked. The central positioning of the temperature sensor 550 can provide for a more consistent internal temperature measurement of the food item 276 being cooked. It is contemplated that the temperature sensor 550 that is centrally disposed on the disk member 540 proximate the motor assembly 158 can be any one of various temperature sensors 550 that can include, but are not limited to, thermostats, thermistors, thermocouples, and other temperature sensing mechanisms. It is contemplated that the temperature sensor 350 can be connected to the powered accessory tray 14 through a wireless or wired connection. Where wired, the wiring can include a rotational adapter that can allow the temperature sensor 550 to rotate with the disk member 540 while preventing damage to the wires from rotation and twisting during use of the spit 160. Accordingly, the temperature sensor 550 is permitted to rotate, while the wires for the temperature sensor 550 remain rotation free or substantially rotation free.

According to various alternate embodiments, it is contemplated that the spit 160 can have a temperature sensor 550 disposed on a portion of a linear member 482, such that as the spit 160 is inserted into a food item 276, the temperature sensor 550 is positioned on the linear member 482 of the spit 160, such that the temperature sensor 550 is substantially centrally positioned within the food item 276 being cooked. In the case of food items 276 having body cavities such as game birds, whole animal roasts, and other similar food items 276, the spit 160 being disposed off-center from the rotating disk member 540 can extend through the body cavity while the temperature sensor 550, being centrally disposed in the disk member 540, can be positioned off-center of the food item 276 and into a meaty portion of the game bird or other animal-type food item 276 being cooked for performing accurate temperature measurements. Accordingly, the temperature sensor 550 can include various configurations to allow for placement of the temperature sensor 550 within an appropriate portion of the food item 276 to properly measure the internal temperature of the food item 276 being cooked. Alternate positions of the temperature sensor 550 can include one or more of the tines of the operable tines 480, a portion of the rotisserie cage 162, and other various locations of the rotisserie insert 148 and/or the rotisserie powered accessory tray 14. It is also contemplated that the temperature sensor 550 can be a remote device that communicates wirelessly or through some form of signal communication with the powered accessory tray 14 and/or the cooking appliance 10 to communicate the internal temperature of the food item 276 being cooked to the user.

According to the various embodiments, another powered accessory tray 14 can include a sous-vide heater for preparing pre-packaged sous-vide foods. The sous-vide heater can be configured to have multiple temperature sensors 550 and multiple heating elements to maintain the accessory heating region 170 of the sous-vide heater at substantially precise levels. Such precision of the temperature sensors 550 and heating elements can be within the range of less than about five degrees Fahrenheit of deviation relative to a desired temperature, or as accurate as one-two degrees Fahrenheit variation. The sous-vide heater can also include a motor assembly 158 for operating a stirring device for assisting in the preparation of the pre-packaged sous-vide foods.

According to various embodiments, another powered accessory tray 14 can include a pressure cooker/canning insert for preparing pressure cooked or canned foods. The pressure cooker/canning insert can include a robust lid and outer walls that provide sufficient support to resist the outward pressure forces experienced during pressure-cooking operations. Various pressure sensors can also be implemented to communicate to the user, via the user interface 242 of the cooking appliance 10, the internal pressure and/or temperature of the pressure cooker/canning insert.

Referring now to FIGS. 1-27, having described the various aspects of the electric oven cavity connector 12 and the various powered accessory trays 14 that can be attached thereto, a method 600 is disclosed for operating the one or more powered accessory trays 14 within the heating cavity 20 of the cooking appliance 10. According to the method 600, an oven cavity connector 12 is provided within the interior wall of the cooking appliance 10 such that the oven cavity connector 12 is in communication with the heating cavity 20 of the cooking appliance 10 (step 602). One or more powered accessory trays 14 are also provided where each of the powered accessory trays 14 are alternatively and selectively engageable with the electric oven cavity connector 12 of the cooking appliance 10 (step 604). It is contemplated that the electric oven cavity connector 12 of the heating cavity 20 can be disposed on a sidewall 16, rear wall 18, bottom wall, or top wall of the heating cavity 20 or combinations thereof in order to provide convenient placement of the electric oven cavity connector 12 to allow for connection of the various powered accessory trays 14 with the oven cavity connector 12.

Referring again to FIGS. 1-27, according to the method 600, the powered accessory tray 14 can be selectively engaged with any one or more of the tray sliding structures 34 disposed within the heating cavity 20 (step 606). In this manner, drawer gliding structures of a base pan 130 of the powered accessory tray 14 can be engaged with any of the tray sliding structures 34 to vertically position the powered accessory tray 14 within the heating cavity 20. It is contemplated that each vertical position defined by the tray sliding structures 34 can have a dedicated oven cavity connector 12 or connecting port 70 positioned nearby. According to the method 600, when the powered accessory tray 14 is slidably engaged with one of the tray sliding structures 34, the powered accessory tray 14 can be moved rearward to allow a connecting plug 32 of the powered accessory tray 14 to directly engage the oven cavity connector 12 to place the powered accessory tray 14 in electrical communication with the cooking appliance 10 (step 608), including a control unit 240 for the cooking appliance 10 and, in various embodiments, a user interface 242 for the cooking appliance 10.

According to the various embodiments, where the heating cavity 20 includes a single oven cavity connector 12, the extension cable 60 can be connected from the powered accessory tray 14 to the oven cavity connector 12 to allow for multiple vertical positions of the powered accessory tray 14 within the heating cavity 20 while simultaneously allowing for a single oven cavity connector 12 that can be engaged to the powered accessory tray 14 through use of the extension cable 60 that is flexible and long enough to extend from the oven cavity connector 12 to any of the vertical positions within the heating cavity 20 that are defined by the tray sliding structures 34.

Referring again to FIGS. 1-27, upon engagement of the connecting plug 32 of the powered accessory tray 14 with the oven cavity connector 12, an accessory detection mechanism 104 disposed within the oven cavity connector 12 engages an identifier portion 210 of the connecting plug 32 of a corresponding powered accessory tray 14 (step 610). When the accessory detection mechanism 104 engages the identifier portion 210, indicative data 212 of the corresponding powered accessory tray 14 is delivered through the accessory detection mechanism 104 and to a control unit 240 of the cooking appliance 10 (step 612). The indicative data 212 of the corresponding powered accessory tray 14 can be a pattern of a raised surface or a predetermined pattern 102 of electrical tabs 100 disposed within the connecting plug 32 that can inform the control unit 240 of the cooking appliance 10 as to the identity of the powered accessory tray 14. As discussed above, it is also contemplated that each powered accessory tray 14 can include operational parameters 214 or instructions for controlling various heating functions of the cooking appliance 10 such that when the connecting plug 32 of the powered accessory tray 14 is engaged with the oven cavity connector 12, these predetermined instructions of the powered accessory tray 14 can be transferred to the cooking appliance 10 for use in conjunction with the user interface 242 of the cooking appliance 10.

According to the various embodiments, where multiple oven cavity connectors 12 or multiple connecting ports 70 are disposed within the cooking appliance 10, a plurality of powered accessory trays 14 can be used simultaneously within the heating cavity 20 for use at the same time. It is also contemplated that where a single oven cavity connector 12 or connecting port 70 is present, an extension cable 60 having a plurality of ends that can engage two or more powered accessory trays 14 can lead into a single second end that engages the single connecting port 70 of the oven cavity connector 12 of the cooking appliance 10. In such an embodiment, it is contemplated that, in certain embodiments, only electrical power may be provided between the cooking appliance 10 and the powered accessory tray 14. Alternatively, it is contemplated that the extension cable 60 having two first ends can include a differentiating mechanism that can separate the separate identifier portions 210 of the connecting plugs 32 of the respective powered accessory trays 14 that are engaged by the extension cable 60 having two first ends.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A cooking appliance comprising:
a plurality of sidewalls and an operable door, the plurality of sidewalls defining an interior surface of a heating cavity;
at least one heat source disposed in thermal communication with the heating cavity;
an oven cavity connector positioned within at least one wall of the plurality of sidewalls, wherein the oven cavity connector includes a plurality of electrical contacts disposed within a connector interior, the connector interior being in communication with the heating cavity; and
at least one rotationally operable door that defines an exterior surface and selectively encloses the connector interior when the at least one rotationally operable door is in an idle state, wherein the at least one rotationally operable door includes a rotational axis that is parallel with the at least one wall of the plurality of sidewalls having the oven cavity connector, wherein a majority of the exterior surface of the at least one rotationally operable door in the idle state is exposed to the heating cavity, the at least one rotationally operable door being biased toward the idle state by a biasing mechanism, and wherein the at least one rotationally operable door is adapted to be biased into the connector interior and toward an engaged state when a connecting plug of a powered accessory tray is engaged with the oven cavity connector, wherein the engaged state is defined by the at least one rotationally operable door being within the connector interior.

2. The cooking appliance of claim 1, wherein the at least one rotationally operable door includes a pair of opposing operable doors, and wherein each of the at least one rotationally operable doors is made of a thermally insulative material, wherein the pair of opposing operable doors in the idle state limits thermal transfer between the heating cavity and the connector interior.

3. The cooking appliance of claim 1, further comprising:
an accessory detection mechanism disposed within the oven cavity connector, wherein the accessory detection mechanism selectively engages an identifier portion disposed on a connecting plug of a corresponding powered accessory tray of a plurality of powered accessory trays, wherein engagement of the connecting plug with the oven cavity connector places the accessory detection mechanism in communication with the identifier portion to transfer indicative data of the corresponding powered accessory tray from the identifier portion to the accessory detection mechanism, and wherein the indicative data of the corresponding powered accessory tray sets predetermined operational parameters of the at least one heat source.

4. The cooking appliance of claim 3, wherein a control unit of the cooking appliance is in communication with the oven cavity connector and a user interface of the cooking appliance, wherein when the powered accessory tray is in communication with the oven cavity connector, the control unit places the user interface of the cooking appliance in signal communication with the powered accessory tray.

5. The cooking appliance of claim 1, further comprising:
a plurality of tray sliding structures vertically positioned within opposing vertical sidewalls of the plurality of sidewalls, the plurality of tray sliding structures positioned adjacent to the oven cavity connector; and
at least one powered accessory tray having a connecting plug, the at least one powered accessory tray being alternatively and selectively engaged with one of the plurality of tray sliding structures, wherein the connecting plug is in selective communication with the oven cavity connector when the powered accessory tray is engaged with any one of the plurality of tray sliding structures.

6. The cooking appliance of claim 5, wherein the powered accessory tray includes a base pan and a resistive heating element, wherein when the base pan is in selective communication with any one of the plurality of tray sliding structures, the resistive heating element is in selective communication with the oven cavity connector.

7. The cooking appliance of claim 6, wherein the powered accessory tray includes an accessory heating region positioned above the resistive heating element and within the heating cavity, and wherein the heating cavity includes a heating region disposed adjacent to the at least one heat source.

8. The cooking appliance of claim 7, wherein the powered accessory tray includes a fluid pan for selectively holding fluid within the heating cavity, and wherein the fluid pan is positioned within the heating region such that the heating region defines at least one steaming zone.

\* \* \* \* \*